(12) United States Patent
Bellin

(10) Patent No.: US 6,346,890 B1
(45) Date of Patent: Feb. 12, 2002

(54) PAGER-BASED COMMUNICATIONS SYSTEM

(76) Inventor: Robert W. Bellin, 4916 N. Hwy. 83, Hartland, WI (US) 53029

( * ) Notice: Subject to any disclaimer, the term of this patent is extended or adjusted under 35 U.S.C. 154(b) by 0 days.

(21) Appl. No.: 09/212,237

(22) Filed: Dec. 16, 1998

Related U.S. Application Data

(63) Continuation-in-part of application No. 08/696,014, filed on Aug. 20, 1996.

(51) Int. Cl.$^7$ .................................................. H04Q 1/00
(52) U.S. Cl. ..................... 340/825.52; 340/7.2; 340/3.5; 340/825.27
(58) Field of Search ....................... 340/825.52, 825.44, 340/825.07, 825.27, 7.2, 3.5; 455/38.1

(56) References Cited

U.S. PATENT DOCUMENTS

| | | | | |
|---|---|---|---|---|
| 5,077,830 A | * | 12/1991 | Mallia | .......................... 455/38.1 |
| 5,122,948 A | * | 6/1992 | Zapolin | ........................... 700/2 |
| 5,398,021 A | * | 3/1995 | Moore | ..................... 340/825.27 |
| 5,635,914 A | * | 6/1997 | Petreye et al. | .............. 340/7.46 |
| 5,694,528 A | * | 12/1997 | Hube | ........................... 358/1.14 |
| 6,041,123 A | * | 3/2000 | Colvin, Sr. | ................... 713/153 |

OTHER PUBLICATIONS

John M. Griffiths, Worldwide Network and Applicatios Technology, Second Edition.*

John M. Griffiths, Worldwide Network and Applicatios Technology, Second Edition, Feb. 1994.*

* cited by examiner

Primary Examiner—Brian Zimmerman
Assistant Examiner—Yves Dalencourt
(74) Attorney, Agent, or Firm—Donald J. Ersler

(57) ABSTRACT

A communications system is provided for communicating information to and from recipients scattered over wide geographic areas. A computer controlled head end communications interface adds address information to a message in accordance with who the intended recipients are. A media router directs the message through appropriate transport media in accordance with the address information. Preferably, the messages are communicated, at least in part, over existing paging systems. Additional transport media include existing power distribution networks, twisted wire pairs and fiber optics networks. Bi-directional reporting capability is provided. The system is well-suited for applications such as remote reading of utility meters, communication of emergency warnings, bi-directional alarm reporting, time synchronization, and encryption/authentication.

21 Claims, 19 Drawing Sheets

PAGER-BASED COMMUNICATIONS SYSTEM

CROSS-REFERENCE TO RELATED APPLICATIONS

This is a continuation-in-part application, Ser. No. 08/696,014 filed on Aug. 20, 1996.

BACKGROUND OF THE INVENTION

1. Field of the Invention

This invention relates generally to wireless communications systems and, more particularly, to systems for communicating address-specific, limited content data messages in one or two directions via a wireless, pager-based communications link.

2. Discussion of the Prior Art

The need to communicate address-specific, limited content data messages over wide areas arises in a variety of applications and contexts. For example, as an increasing number of people move into and live in areas considered remote, rural or semi-rural, it becomes increasingly burdensome and costly for utilities, such as power companies, to send individual personnel into the field to read residential power consumption meters. The time and expense required for a person to physically visit a remote residence and read the meter is out of proportion to the relatively limited (but, nevertheless, important) data thus acquired. Similarly, when it is necessary for a utility to communicate with its customers (e.g. regarding rate changes and the like), this is typically done through the mail—another burdensome and costly process.

In addition to the expense, mail communication suffers from considerable delay between when the need to communicate arises and when the communication is actually received. Similarly, mail communication is ineffective in dealing with short term, immediate crises, such as a need to reduce power consumption in times of unusually heavy demand brought about, for example, by an oppressive heat wave. In such circumstance, utilities have relied on local broadcast media to spread the message to reduce unnecessary power consumption. Such broadcasts, effective as they are in transmitting a message quickly over a wide area, are, by nature, not address specific. Accordingly, they are transmitted equally to those who are affected by the crises as well as to those who are not. Although address-specific, wire-based communications links, such as private telephone lines have existed for years, the cost of providing dedicated lines for relatively limited communications needs is prohibitive.

One form of existing wireless, address-specific communications system is the "paging" system of known configuration. Paging systems combine the speed and coverage of wireless "broadcast" techniques with the address-specific capabilities of wire-based systems. Such paging systems are also configured for the address-specific transmission of limited data messages. Accordingly, wireless paging systems can be well suited for providing cost-effective, efficient and immediate, limited communications between, for example, utilities and police, fire and disaster control authorities on the one hand, and widely dispersed community residents on the other.

A paging protocol sold under the trademark name of ReFLEX is used for reporting information from a remote device to a central monitoring location. A message send request is generated at a remote device, the ReFLEX protocol sends an "Aloha" message to the central monitoring location. The Aloha message is a short data packet containing a small number of data bits. The Aloha message is used to request a time reporting slot for a future message which the remote device will send through the ReFLEX protocol. The central monitoring location will send the remote device a particular time reporting slot and the remote device will send numerous data bits describing the message during the assigned time reporting slot. This technology can be utilized for alarm reporting, but the alarm notification will take one to two minutes to complete which is unacceptable for emergency situations such as fire or theft of valuable material.

SUMMARY OF THE INVENTION

The invention provides a communications system including a plurality of potential message recipients categorized into one or more groups and assigned a specific address according to group. The system further includes a head end communication interface for generating a message to be received by one or more of the groups of potential message recipients and including in the message the specific address or addresses of the group or groups to receive the message. The system further includes a head end media interface including a wireless transmitter for broadcasting the message via a wireless signal over a geographic area including the potential message recipients, and a wireless receiver associated with each of the potential message recipients and responsive to the specific address of the group to which the associated message recipient belongs so that messages directed to members of the group are received by members of the group in response to receipt by the wireless receiver of the group specific address.

In one embodiment, the wireless transmitter and the wireless receivers are part of a paging system.

The invention also provides a wireless communications system for directing a message to a specific group within a plurality of potential message recipients. The system includes a transmitter operable to transmit a wireless signal over a geographic area containing the potential message recipients and a plurality of receivers each associate with a particular one of the potential message recipients. The receivers associated with members of the specific group are operable to respond to a specific address signifying the specific group. The system further includes a head end communication interface for incorporating into the message the specific address of the specific group intended to receive the message and for communicating to the transmitter the message containing the incorporated specific address so that, upon receiving the message and incorporated specific address, the receivers responsive to the specific address accept the message and communicate the message to the specific group.

The invention also provides a method of operating a wireless paging system so as to communicate group specific messages to specific groups among a plurality of potential message recipients. The method includes the steps of identifying specific groups among the plurality of potential message recipients, assigning to each of the identified specific groups a group specific address, equipping each of the potential message recipients with a wireless receiver responsive to the group specific address of the specific group to which the potential message recipient belongs, generating a message containing an informational portion and an address portion, the address portion including the group specific address of the specific group intended to receive the message, and transmitting via a wireless signal the message over a geographic area containing the potential message recipients so that the receivers responsive to the group specific address will accept the message and communicate the informational portion of the message to the member of the specific group.

In one embodiment, the method further includes the step of routing the message to an appropriate transport medium in accordance with a sub-address included in the address portion.

In one embodiment, the sub-address indicates a particular device associated with one or more of the receivers. The invention also provides a method of communicating location specific messages from a plurality of remote locations to another location wherein the remote locations are interconnected by means of an existing transport medium. The method includes the steps of providing a remote media interface gateway having a wireless transmitter, coupling the remote media interface gateway to the transport medium, generating a location specific message at one of the remote locations, communicating the location specific message to a remote media interface gateway via the transport medium, transmitting the location specific message via the wireless transmitter to a wireless receiver, communicating the location specific message from the receiver to a head end communications interface, and decoding the location specific message to determine the location of its origin and the meaning of its content.

It is an object of the invention to provide a new and improved system for communicating with specific groups among a plurality of geographically dispersed potential recipients.

It is a further object of the invention to provide a communications system that permits communication with specific ones of several remote sites in a geographic area while utilizing existing, low-cost communications media.

It is a further object of the invention to provide a communications system that permits remote accessing of data generated at various specified ones of a plurality of remote sites dispersed over a geographic area.

It is a further object of the invention to provide a communications system that permits automatic communication of an alarm or other such non-scheduled message automatically from a remote site to a central location using existing, low-cost communications media.

It is a further object of the invention to provide a communications system that permits remote control of specific remotely located devices over a wide geographic area using existing, low-cost communications media.

It is a further object of the invention to provide a communications system that includes a media routing feature that provides for communications through various available media in accordance with the type, location and nature of communication needed.

It is a further object of the invention to provide a communications system that incorporates a logic protocol feature for translating between the logic/application level protocols of different physical media.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENTS

Figure 1:
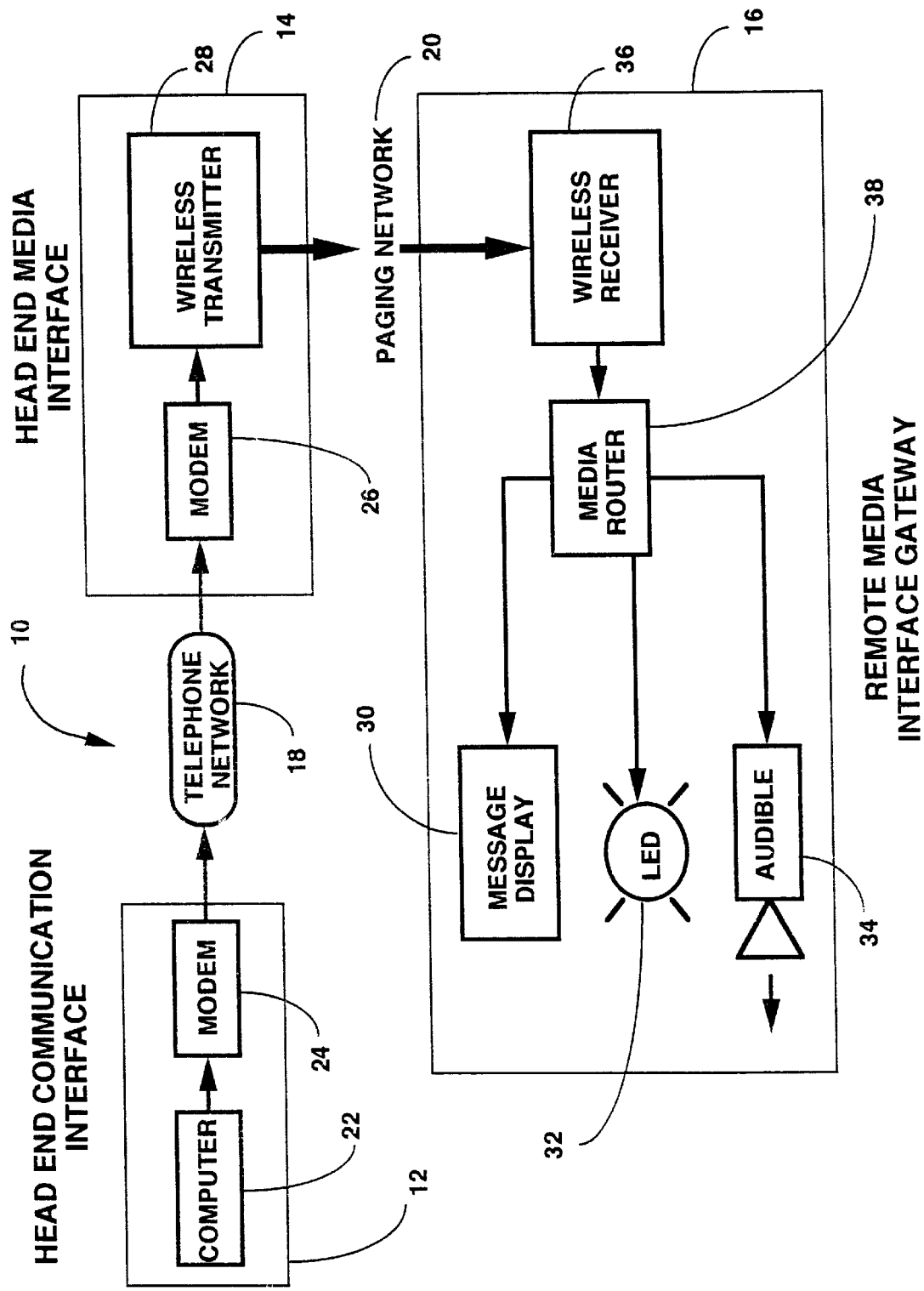
FIG. 1 is a simplified block diagram of a one-way, pager-based communications system embodying various features of the invention.

Referring to the drawings and, in particular, to FIG. 1, a simplified block diagram of a pager-based communications system 10 is illustrated. In accordance with one aspect of the invention, the system 10 is configured to communicate information from a central location to a specific group of potential message recipients scattered over a wide geographic area. In the illustrated embodiment, the system is particularly well suited for use by utilities, public safety departments, disaster warning agencies and the like to transmit limited, content specific messages to particular groups of recipients among a larger group of potential recipients. For example, the system can be used by a metropolitan disaster agency to warn particular residents of a community (e.g. those residents living in the flood plain of a river) of an impending situation affecting only those residents (e.g., imminent flooding along the river). Although a signal is broadcast over the entire community and, hence, is potentially receivable by every member of the community, the system 10 functions automatically to direct the message to the affected members without also directing the message to the unaffected members. This helps ensure that the affected members receive the message and also helps avoid "bothering" the unaffected members with a message that does not concern them. In accordance with a principal aspect of the invention, the system is easily and economically implemented using substantially existing communications media that are already in place.

In the illustrated embodiment, the system 10 includes a head end communication interface 12, a head end media interface 14 and a remote media interface gateway 16. The head end communication interface 12 communicates with the head end media interface 14 via a telephone network 18 of known construction, and the head end media interface communicates with the remote media interface gateway 16 via an existing paging network 20, also of known construction. In the illustrated embodiment, the head end media interface actually makes up part of the paging network and can be of conventional, known construction. The head end communication interface 12 originates the message to be communicated to the specified group of potential recipients and includes a computer 22 coupled to the telephone network through a modem 24. Although an existing telephone network 18 is contemplated, it should be understood that the particular type of system used is not critical to the invention, and that other forms of existing and future communications systems, i.e., analog or digital, wireless personal communications, coaxial, broad-band fiber, optics etc., can be used.

It is assumed that specified groups of potential recipients have been previously identified according to some selection criteria. For example, potential recipients can be classified according to such factors as (a) physical location within the geographic area, (b) susceptibility to hazardous conditions (e.g. high ozone levels), (c) proximity to potential catastrophes (e.g., flooding rivers) etc., or can be classified according to which utilities they use (water, gas, electric etc.) and at what rate, (e.g. commercial or residential). In any event, the potential recipients are classified according to group and are assigned a unique identifier or "address" unique and common to members of the specific group. This "address" may also be referred to as a base group address. The particular classification or assignment of group is not critical to the invention, and the types of classifications herein referenced are for illustrative rather than limiting purposes. A message is defined by a set number of bits, some of the bits are used to define the base group address, and some of the other bits are used to define a message portion. The message portion contains information such as a telephone number.

The computer 22 functions to keep track of the specific groups and their unique addresses and further functions to add the appropriate address to messages intended for specific groups. Thus, if a message is to be sent to a specific group of potential recipients, the computer identifies the appropriate address and incorporates the subgroup address into the message portion of the message. An appended message is formed by inserting the subgroup address into the message portion. The appended message with the incorporated subgroup address is then communicated through the modem 24 and existing telephone network 18 to the head end media interface 14. The head end media interface 14 includes a modem 26 that receives the message with the incorporated address and supplies both the message with the incorporated address to a wireless transmitter 28 for broadcast over the paging network 20.

In accordance with another principal aspect of the invention, the address information that identifies the specific group to receive the message is added into the message portion and is in addition to the single operating base group address that is procured from the pager service provider. Thus by incorporating the group-specific address information into the message itself, the system 10 allows single device or pre-determined grouping of several devices using a single operating base group address. Because only a single base group address need be procured from the pager service provider, considerable economy is realized.

The system 10 allows a utility or a governmental agency to target specific operating areas based on operational or warning needs. The remote media interface gateway functions to route the message, after its receipt by the targeted group member, to an appropriate display based on the type of message received. For example, the remote media interface gateway can include various types of display devices, such as an alphanumeric display 30, an LED display 32 and an audible warning 34, coupled to a wireless receiver 36 through a media router 38. After the message is received by the wireless receiver 36, the media router interprets additional information coded into the message to determine the nature of the message and direct the message to the appropriate display. In the case of utilities, rate changes can be displayed, for example, in the form of an illuminated LED and the new rate displayed on the message display 30. Warnings of weather or emergency conditions can be displayed in a similar manner with the addition of an audible warning to attract the recipient's attention. The audible warning could be used, for example, to alert the user to view the detailed information appearing on the message display 30. Preferably, the various indicator devices 30, 32 and 34, and the media router 38 and wireless receiver 36, are all integrated into a single unit comprising the remote media interface gateway 16.

Figure 2:
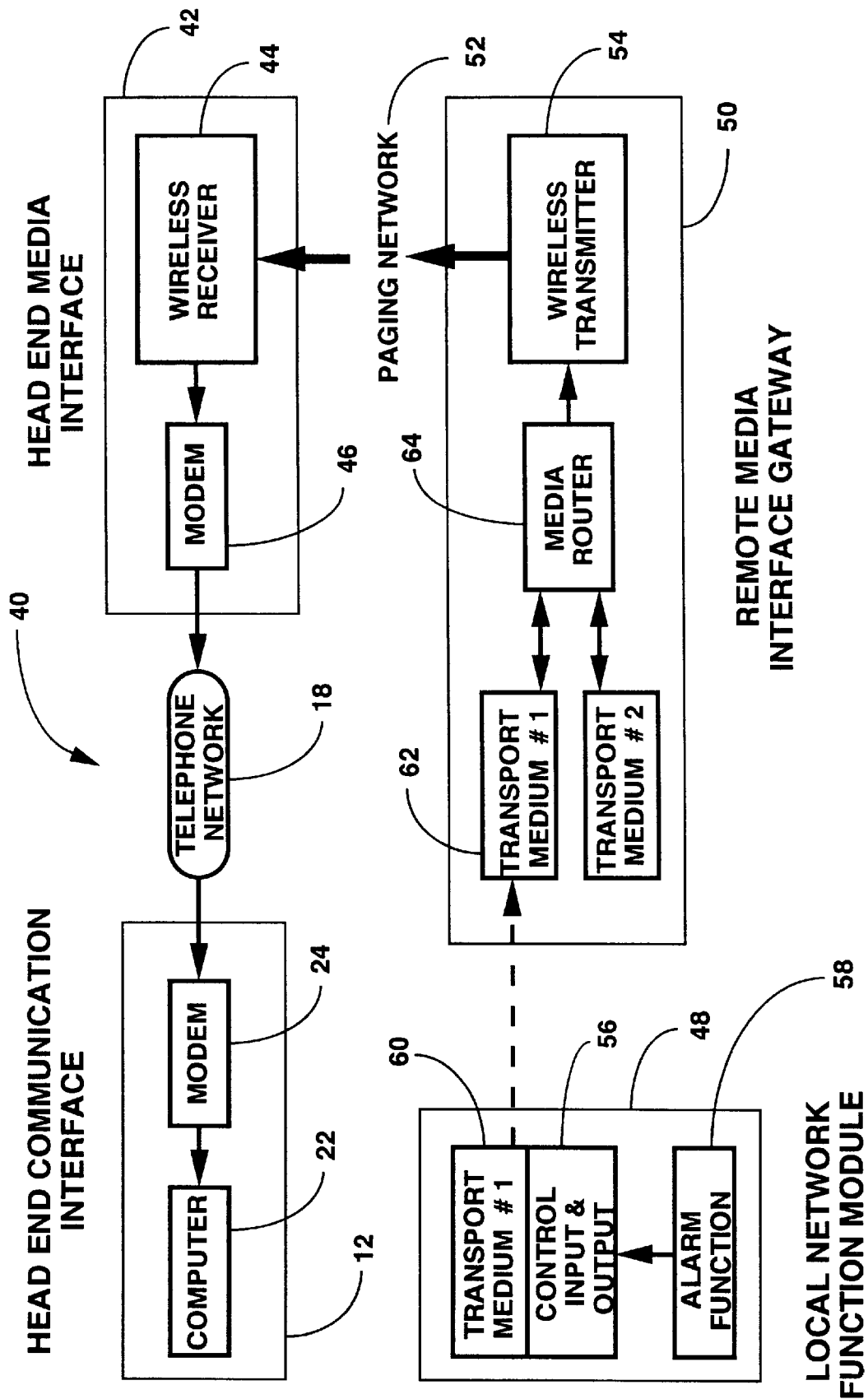
FIG. 2 is a simplified block diagram of a one-way, pager-based alarm reporting communications system embodying various features of the invention.

Referring to FIG. 2, another system 40 embodying the invention is illustrated. In this system 40, communication from a remote site back to a central location is provided. The system 40 includes a head end communication interface 12 coupled to a telephone network as in the previously described system 10 of FIG. 1. In addition, the system 40 includes a head end media interface 42 that has a wireless receiver 44 coupled to the telephone network 18 through a modem 46. The system further includes a local network function module 48 and a remote media interface gateway 50 coupled to the local network function module through some form of transport medium. As used herein, such a transport medium is intended to include any medium through which electrical or optical signals or energy can be transported from one location to another and includes, for example, power distribution networks and wiring, telephone or data communication networks, wireless links, optical fibers and the like. The remote media interface gateway communicates with the head end media interface 42 through a paging network 52 having a wireless transmitter 54 associated with the remote media interface gateway 50 and a wireless receiver 44 associated with the head end media interface 42.

The system 40 is particularly well suited for communicating a signal, such as an alarm signal or serial data stream, from a remote location to a central location such as a police station or private security headquarters. In accordance with one aspect of the invention, the system 40 makes use of existing links, such as power wiring, to communicate signals to and from the remote location. To this end, the local network function module 48 includes a control input and output circuit 56 that receives an alarm function 58 from an appropriate source, such as, for example, a burglar or fire alarm, and generates an appropriate alarm message incorporating the location of the emergency as well as its nature. The message is supplied to the available transport medium 60, such as the power line network, for transmission to the remote media interface gateway 50. The remote media interface gateway 50, which is located remotely from the local network function module 48, receives the message through an appropriate transport medium input port 62 that is coupled through a media router 64 to the wireless transmitter 54.

The wireless transmitter 54 transmits the message over the paging network 52 back to the wireless receiver 44 of the head end media interface 42. The message thus received is communicated through the modem 46, the telephone network 18 and the modem 24 to the computer 22 of the head end communication interface 12. To facilitate communication, enhance economy and provide system flexibility, the system 40 "keeps track" of the various communications media through which the various remote locations and their associated local network function modules 48 are interconnected with the remote media interface gateway 50. For example, those remote locations that are interconnected through the power distribution network (transport media #1) are categorized according to type and designated with a particular address element that is recognized by the media router 64. When a message intended for or received from a remote site connected through the power distribution network is to be communicated, the media router selects the appropriate transport medium, in this case medium #1. Other remote sites might be coupled to the remote media interface gateway 50 through other media such as a wireless link (transport medium #2). Messages from or to such remote sites are directed, through the media router 64, to the appropriate transport medium, in this case transport medium #2. By utilizing existing communications links, the system 40 permits one-way alarm reporting in an economical manner. When a message from a remote site is received and routed back to the head end communication interface, the computer decodes the message as to type (fire, security breach etc.) and location and directs an appropriate display to the proper personnel.

Figure 3:
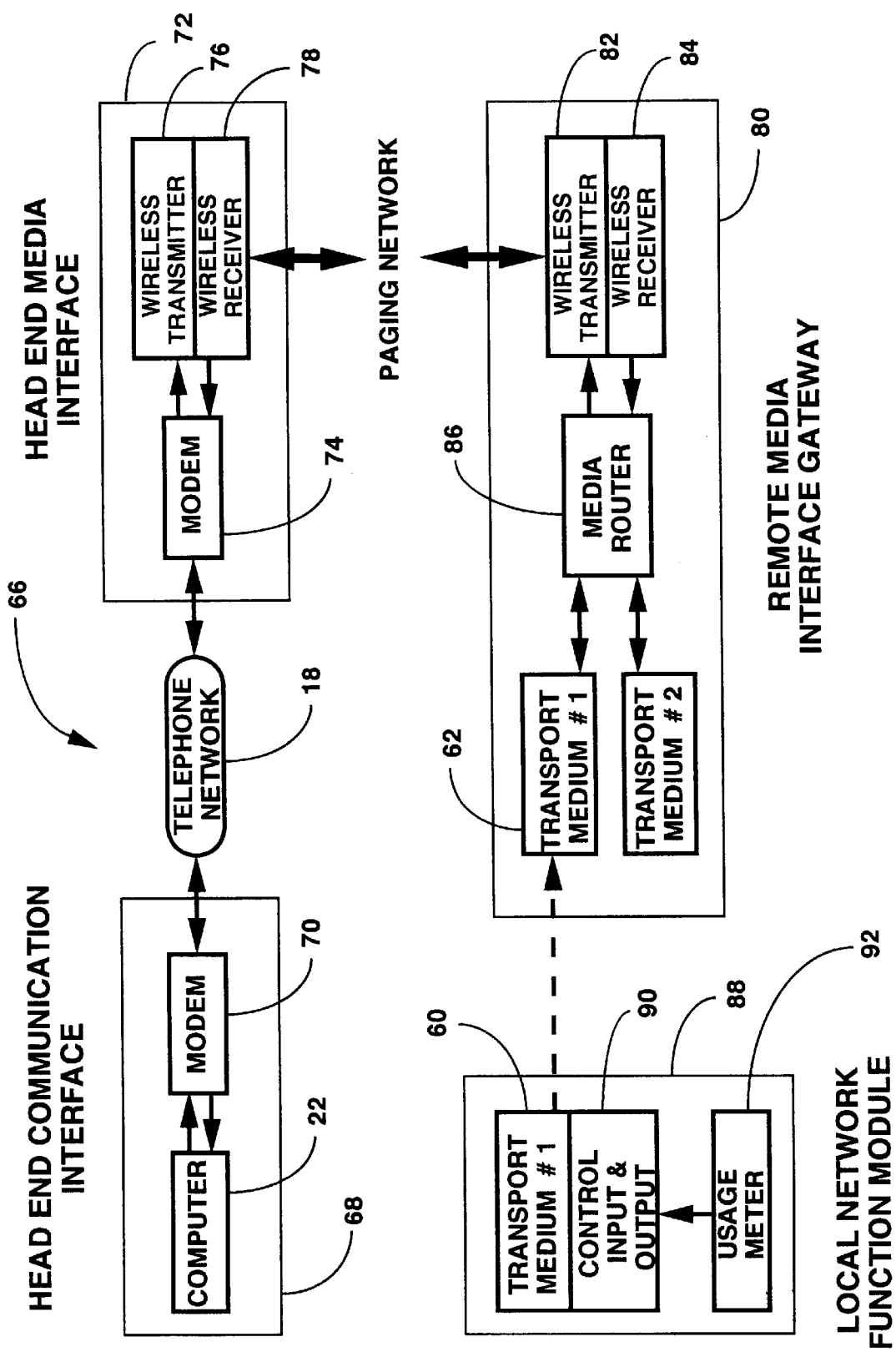
FIG. 3 is a simplified block diagram of a pager-based, two-way meter reading communications system embodying various features of the invention.

Referring to FIG. 3, another system 66 embodying the invention is illustrated. System 66 is particularly well suited for requesting and receiving data from remote locations dispersed over a wide geographic area. In this system 66, a head end communication interface 68 having a computer 22 and a modem 70 operable in a bi-directional mode is used as is a head end media interface 72 having a bi-directional modem 74, a wireless paging transmitter 76 and a wireless paging receiver 78. The head end communication interface 68 and the head end media interface 72 communicate through the telephone network 18. A remote media interface gateway 80 is provided that includes a wireless transmitter 82 and a wireless receiver 84 that are coupled to a media router 86 that in turn is coupled to one or more transport media 62, such as the power distribution network. Finally, the system 66 includes, at one or more remote sites, one or more local network function modules 88. The local network function module 88 includes an interface 60 to the connected transport medium and further includes a control input and output circuit 90 and, in the illustrated exemplary embodiment, a usage meter 90. The usage meter 92 comprises an electric consumption meter and is shown only as an example and not as a required element of the invention. In the illustrated embodiment, the system 66 enables a centralized agency, such as a power utility company, to read electric power consumption meters located at remote sites from the central location and without having to send personnel to the remote site.

In operation, the system 66 first generates a page at the head end communication interface 70 that is communicated through the telephone network 18 to the head end media interface 72. The computer 22 generates an appropriate address indicative of the remote site to be interrogated as well as an appropriate interrogation request. The message thus generated is transmitted via the wireless transmitter 76 to the remote media interface gateway which decodes the proper address and message request type. The media router 86 directs the message request through the appropriate transport medium to the local network function module 88, which decodes the request and obtains the requested information. The local network function module 88 then communicates the requested information back through the appropriate transport medium to the remote media interface gateway 80, that, in turn, transmits the requested data to the head end media interface 72 for further communication back to the head end communication interface 68. In each case, proper routing address information would be incorporated into both the message sent to the local network function module 88 and in the return message sent back to the head end communication interface 68 from the remote location. The head end communication interface 68 would then organize the information by displaying the initial meter reading request for a given address with the actual reading received. Alternatively, the reporting function can occur as part of a pre-determined schedule, protocol or other plan rather than through direct request.

Figure 4:
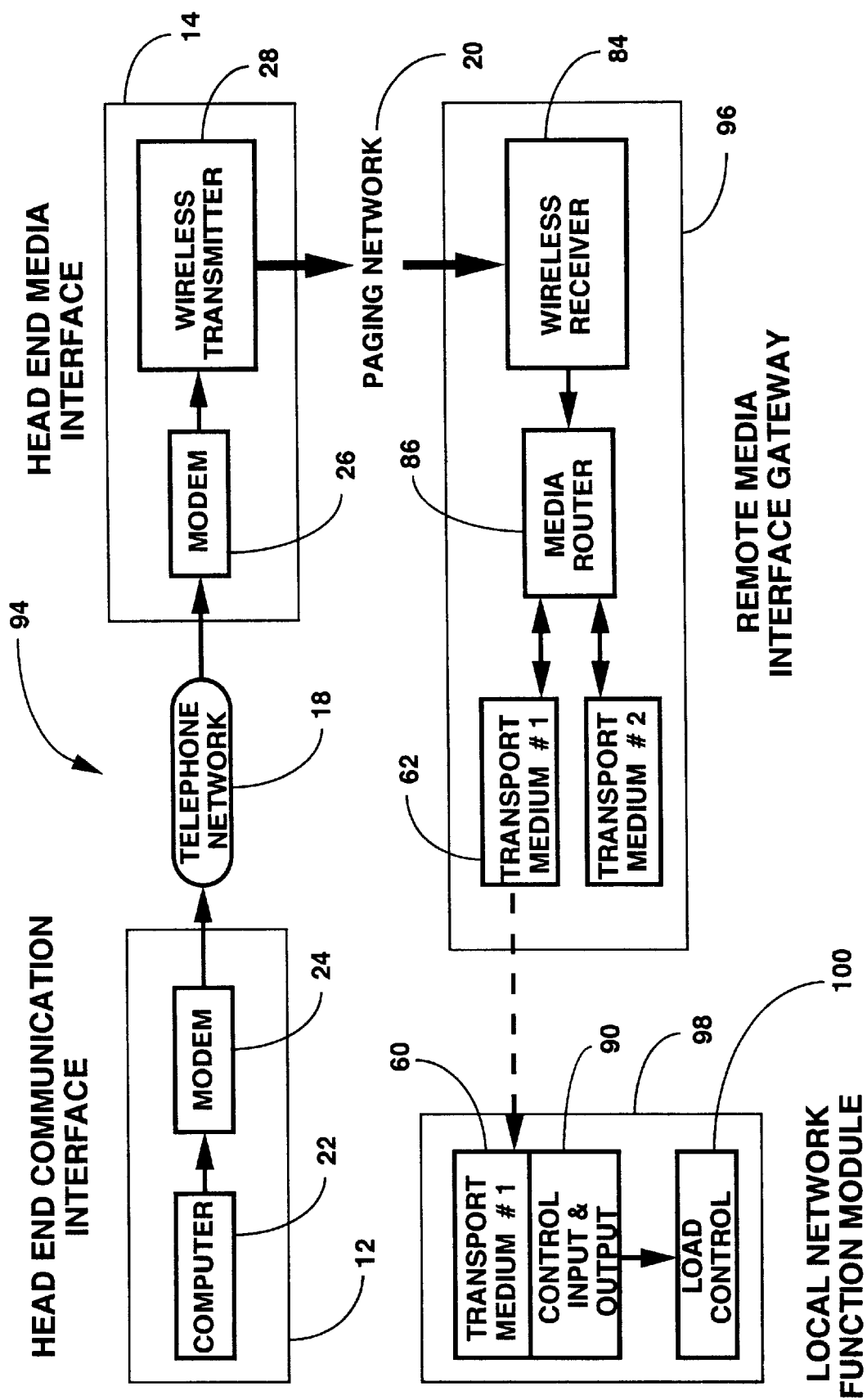
FIG. 4 is a simplified block diagram of a pager-based, one-way remote control communications system embodying various features of the invention.

Referring to FIG. 4, another system 94 embodying various features of the invention is shown. This system 94 permits remote command of remotely located devices from a central location. In particular, the system provides for sending a specific control command to a remote device and meets two immediate needs. The first is to enable a remote authority, such as, for example, a power utility company, to remotely control devices, such as water heaters or air conditioners, so as to enable the power utility to change demand at times of peak load. The second is to enable a user to control devices, such as a residential heating system, from a remote location.

The system 94 is similar to the one-way broadcast system of FIG. 1 and includes the head end communication interface 12, the telephone network 18 and the head end media interface 14. The system further includes a remote media interface gateway 96 including a wireless receiver 84, media router 86 and various transport media 62, such as a power distribution network. Finally, the system 94 includes a local network function module 98 that, like that of the system 66 shown in FIG. 3, includes a transport medium interface 60 and control input and output circuit 90, but has a load control 100 coupled to the control input and output circuit 90. The load control 100 is operable, in response to applied external commands to control an external load or device.

In operation, a page is sent from the one-way head end unit 12 and the head end media interface 14 with the transmitter 28 first sending the data to the remote media interface gateway through the paging network 20. The remote media interface gateway 96 decodes the proper address and control message type and/or function and then routes the request through the proper local transport medium, such as a power line, to the local network function models 98. The local network function module 98 decodes the message and turns the device on or off as required.

In the system 94, the communication is one-way from the head end media interface 14 to the remote media interface gateway 96. The head end communication interface organizes the information by matching the remote address location and control function type by displaying the address with the actual control function desired. The needs met by the system 94 require the ability to reach a wide range of remote locations organized by specific groups or even a single location. The reception/address information is contained in the actual message and is decoded by the remote media interface gateway 96. Existing paging systems operate by sending a single base group address to a single receiver. By adding additional address information into the message, the system 94 allows single device or pre-determined grouping of several devices using a single operating base group address. This provides a great economic advantage in that only one base group address need be procured from a pager service provider. The system 94 enable a utility to target specific operating areas based on operational needs, such as electrical load to be shed.

In accordance with still another aspect of the invention, capability is provided for performing logic/application level protocol translations between different physical media where required to execute various services. This allows components of different manufacturers to be interconnected into a single interoperable system. For example, security sensor operational alarms on an Echelon LonTalk system can be passed to a X.10 Bus lighting system so that outdoor lights can be turned on when an alarm transmission is generated by the remote media interface gateway as part of reporting a transmission to the head end communications interface. Such an approach is shown in the system 102 of FIG. 5 wherein a remote media interface gateway 80 of the type shown in FIG. 3 communicates with a plurality of local network function modules 88, 88' and a logical protocol conversion takes place between the two local network function modules 88, 88'. A similar system 104 is shown in FIG. 6.

Figure 5:
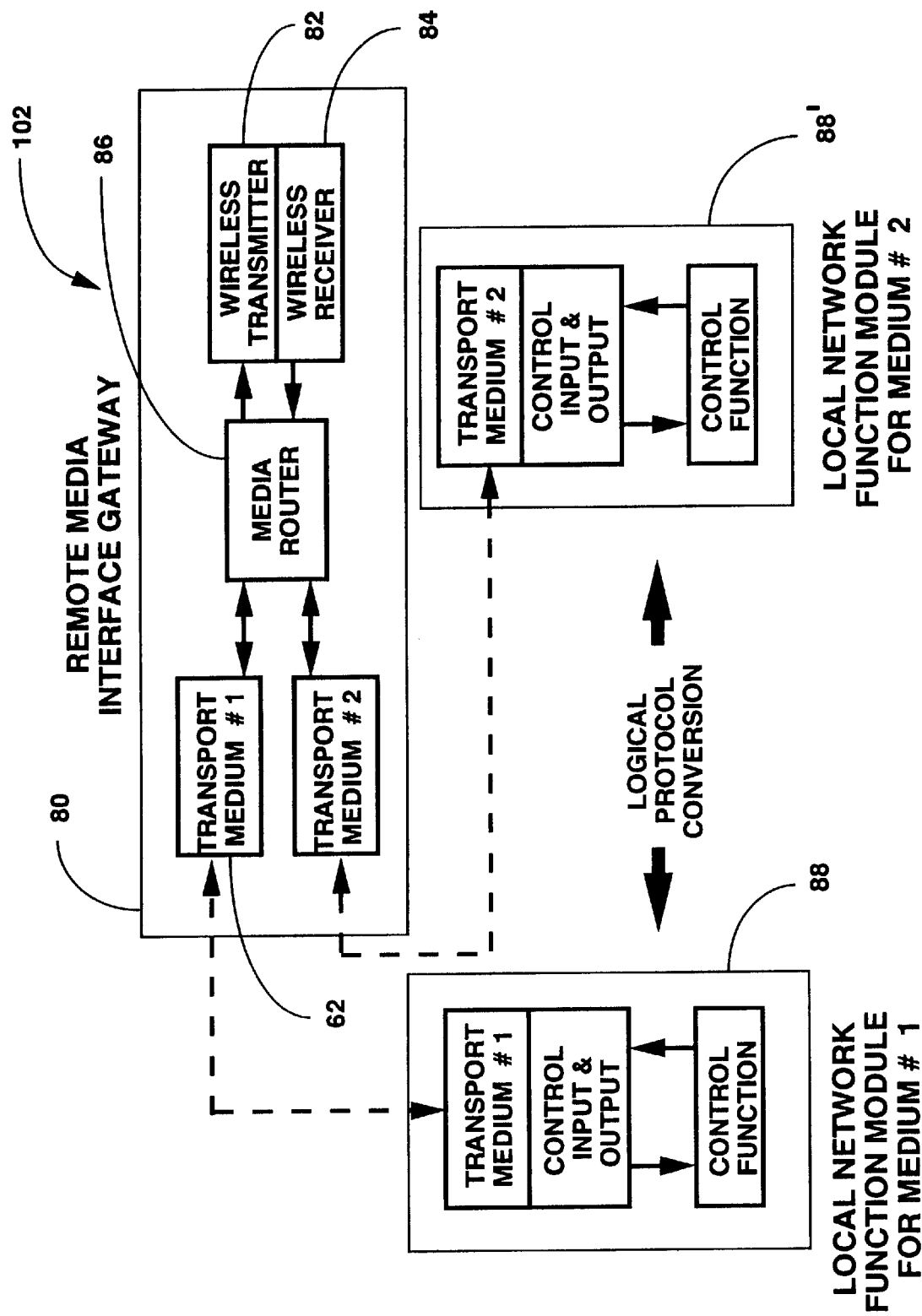
FIG. 5 is a simplified block diagram of a first embodiment of a logical/application protocol conversion system embodying various features of the invention and useful in conjunction with the pager-based communications systems herein disclosed.
Figure 6:
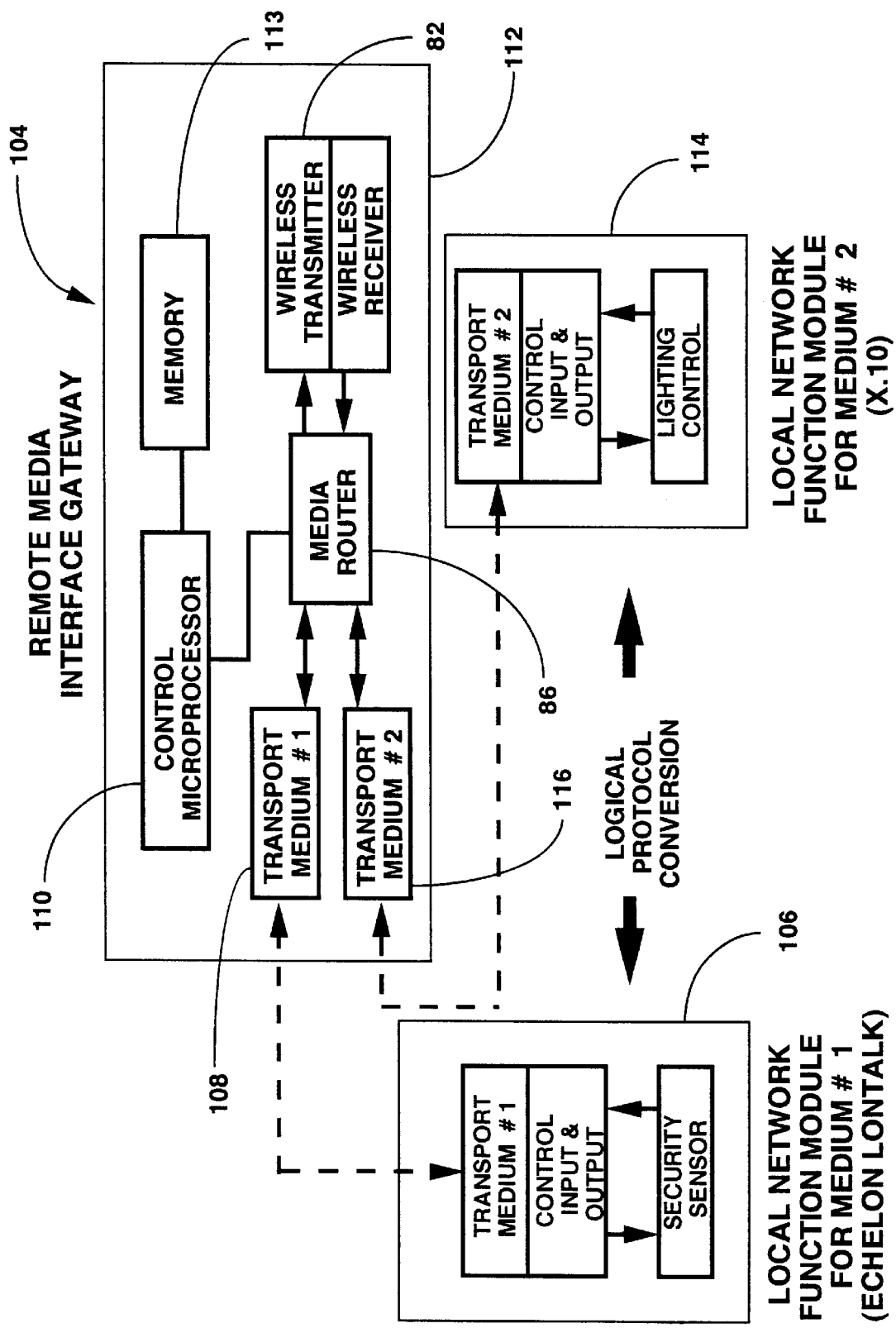
FIG. 6 is a simplified block diagram of another embodiment of a logical/application protocol conversion system embodying various features of the invention and useful in conjunction with the pager-based communications systems herein disclosed.

Referring to FIG. 6, the system 104 includes a remote media interface gateway 112, which includes a control processor 110 coupled to the media router 86 but is otherwise similar to the remote media interface gateway 80 shown in FIGS. 3 and 5. A security sensor 106 coupled to an Echelon LonTalk transport medium 108 is coupled to the control processor 110. When the security sensor 106 detects an alarm condition, the alarm message thus generated is transported to the control processor 110 through the media router 86 to the wireless transmitter 82. The transmitter 82 sends the alarm message to a remote head end communication interface 68 (FIG. 3). The control processor 110 recognizes the security sensor 106 operation as an alarm condition and matches this sensor operation to a logical look-up table in the attached memory 113. The table indicates that, when the sensor 106 operates, a lighting control function (i.e., turn on the light) is desired. A functional module 114 is coupled to the light and is also coupled to the media router 86 through the second transport medium 116. In this example, two logical functions are connected between two different physical media that are not directly compatible at the physical level.

As previously noted, the various communications systems disclosed herein make use of the power distribution system as an important available transport medium. Typically, power is distributed by means of a three-wire system having two "hot" lines, L1 and L2, and one neutral line. Typically, 240 V power is available across lines L1 and L2 while 120 V power can be obtained between either of the lines L1 or L2 and neutral. Because the communications systems disclosed herein might require communications between devices coupled to different lines of the power distribution system, various coupling networks are provided for permitting such communication.

Figure 7:
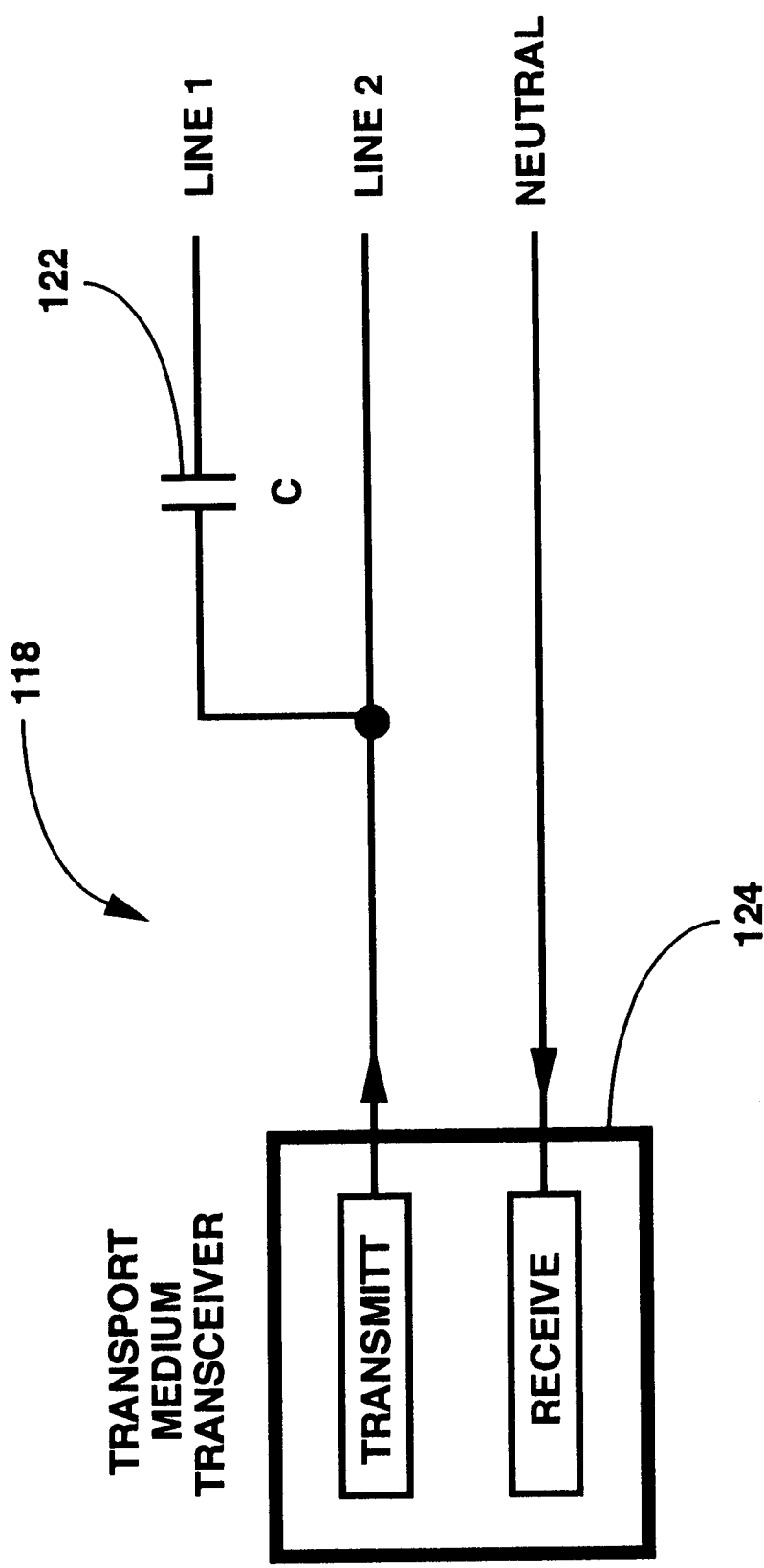
FIG. 7 is a simplified block diagram of one form of network operable to interconnect the communications elements of two separate devices coupled to different lines of a three-wire power distribution system.

FIG. 7 shows a system 118 for permitting power line communication between devices that operate on 120 VAC and that are connected to the neutral line and different ones of the "hot" lines, L1 and L2. In this system, a transport medium transceiver 124 is coupled directly to both lines L1 and L2. When the word "transceiver" is used in this application it means a combined receiver and transmitter.

Figure 8:
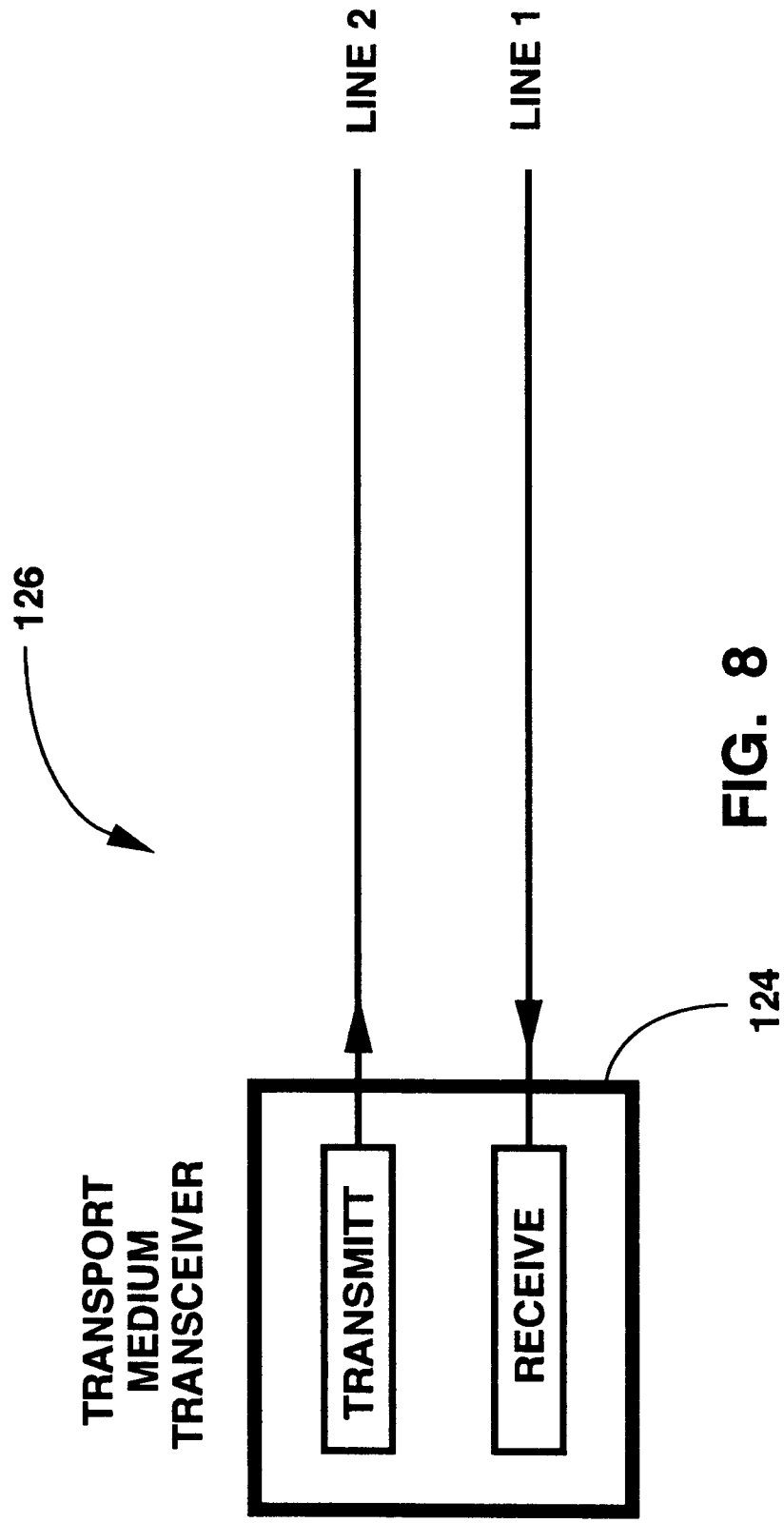
FIG. 8 is a simplified block diagram of another form of network operable to interconnect the communications elements of two separate devices coupled to different lines of a three-wire power distribution system.
Figure 9:
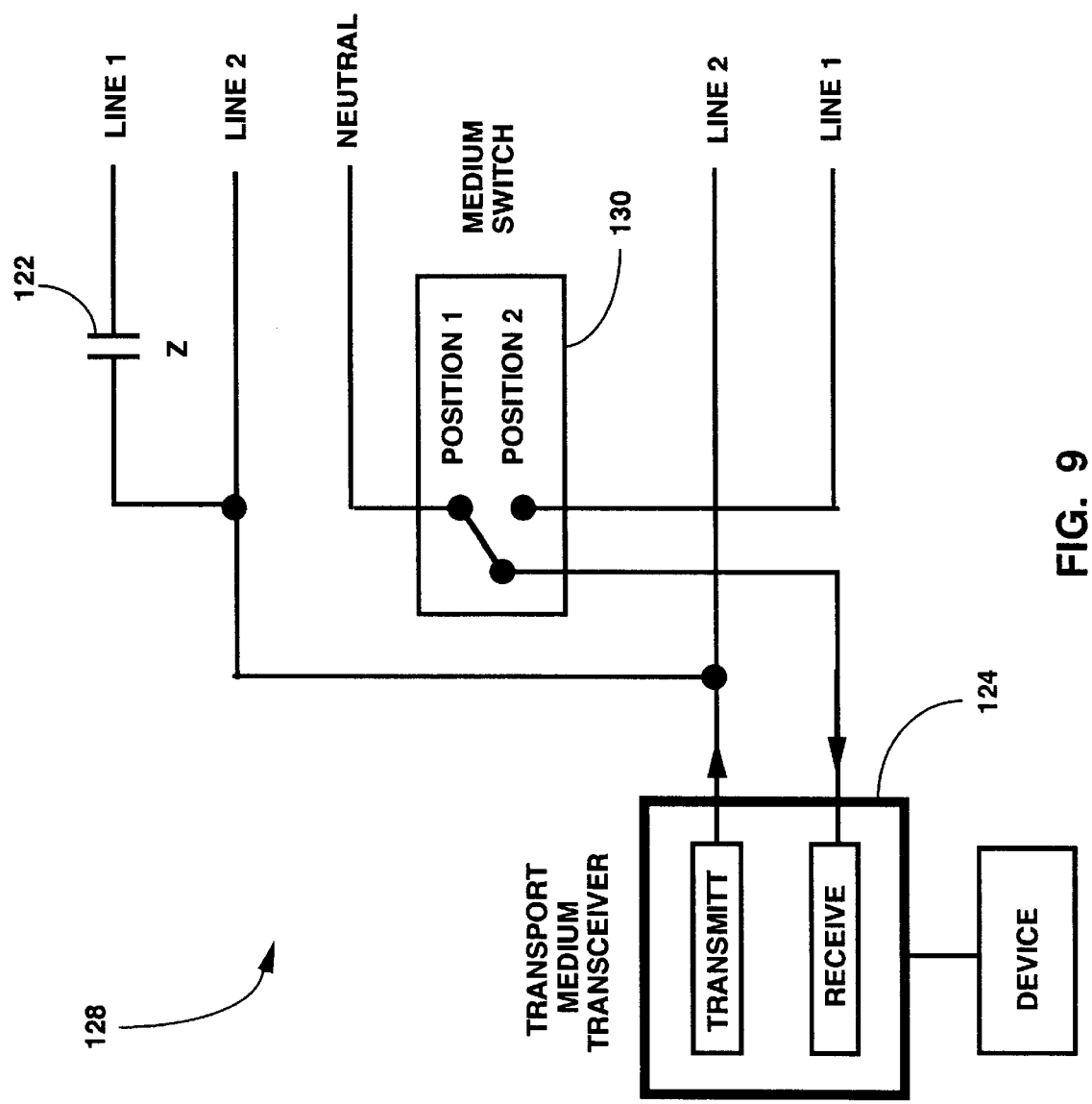
FIG. 9 is a simplified block diagram of a switchable network embodying various features of the invention useful in interconnecting the communications elements of various devices coupled to different lines of a three-wire power distribution system.

FIG. 8 shows a network 126 suitable for permitting communications between devices that operate at 240 VAC and that are coupled between both of the lines L1 and L2. In this system 126, the transport medium transceiver is simply connected to both of the lines L1 and L2.

Neither of the systems 118 or 126 permits communications between all devices regardless of whether they are connected between L1 and neutral, L2 and neutral or between L1 and L2. Accordingly, and in accordance with one aspect of the invention, a switchable interface network 128 is provided. The system 128 includes a controllable medium switch 130 that is connected as shown. In the system 128, lines L1 and L2 are coupled, at signal frequencies, by the capacitor 122. One side of the transport medium transceiver 124 is coupled directly to line L2 and, through the capacitor 122, to line L1. The other side of the transport medium transceiver 124 is connected to the common pole of the medium switch 130. The medium switch 130 functions to couple the transport medium transceiver 124 to either the neutral line or to line L1. When the medium switch 130 is in a first position, position 1, the transport medium transceiver 124 is coupled to the neutral line and hence is configured for communications with 120 VAC devices coupled between lines L1 and L2 and neutral. When the medium switch 130 is in the opposite position, position 2, the transport medium transceiver 124 is configured for communications with 240 VAC devices connected across line L1 and L2. The medium switch 130 is under the control of the media router 86 (FIGS. 3–6) which sets the medium switch 130 as required for the desired communication. The system 128 thus provides complete flexibility for communications via the power lines among various different, and differently connected, devices.

Figure 10:
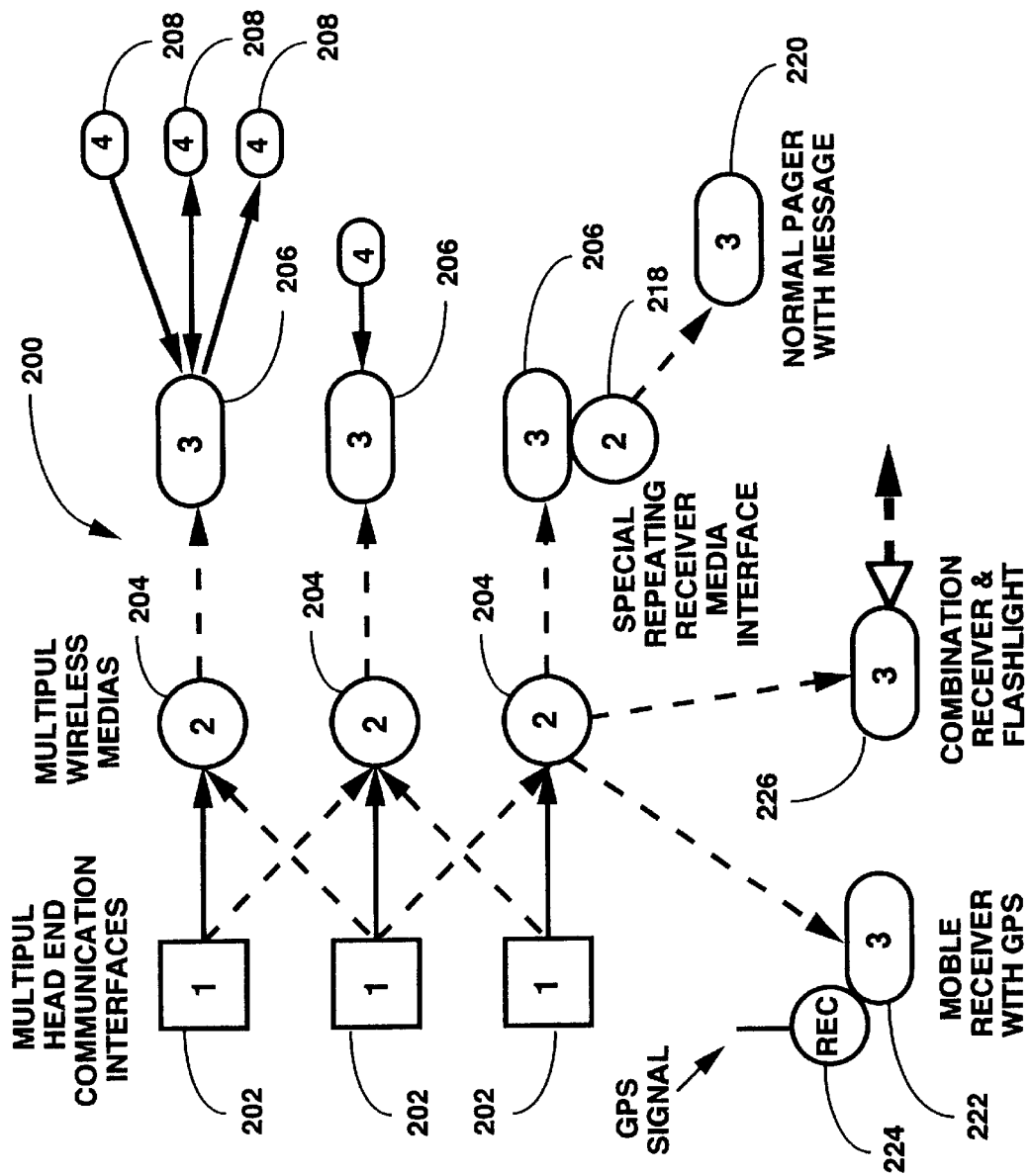
FIG. 10 is a simplified block diagram of an alternate embodiment pager-based communications system offering still further flexibility in directing various types of communications to and from various ones or subgroups of receivers within a paging area.

FIG. 10 shows system 200, further flexibility in communicating to and from selected subgroups of users is provided. In FIG. 10, one or more head end communications interfaces 202 are provided. Each of the head end communications interfaces 202 can communicate with any one of a plurality of wireless communications media 204, such as separate, existing paging systems. A plurality of remote media interface gateways 206, each responsive to a particular one of the wireless communications media 204, are also provided. Each of the remote media interface gateways, in turn, is coupled to one or more local network function modules indicated generically at 208. As previously noted, one important function of the pager-based communications systems described herein is to broadcast a single message or item of information over a wide area serviced by a wireless communications medium. Such a function can be served, for example, by transmission of an alphanumeric character message to one or more remote locations for emergency or disaster warnings, such as severe weather, a chemical spill or other such local, hazardous environmental condition. This function requires the ability to reach a wide range of remote locations organized by specific groups or even a single location.

In operation, a message or data string is sent by one of the wireless communications media or transmitters 204 to one or more of the paging receivers 208. This can be accomplished using known, one-way, telephone dial up modem, alphanumeric paging techniques. A single base group address sent by the transmitter 204 to all receivers 208 within the service area, activates each of the receivers 208 responsive to the base group address in the conventional manner. However, additional subgroup address information, included in the message portion is decoded and used by the individual receivers 208 in the manner previously described, to determine whether they are part of the predetermined subgroup for which the particular message or information is intended. Given the capability of the pager-based communications systems described herein to address preselected or determined subgroups among all the selective call receivers located within the pager service area, various desirable ends can be achieved.

Figure 11:
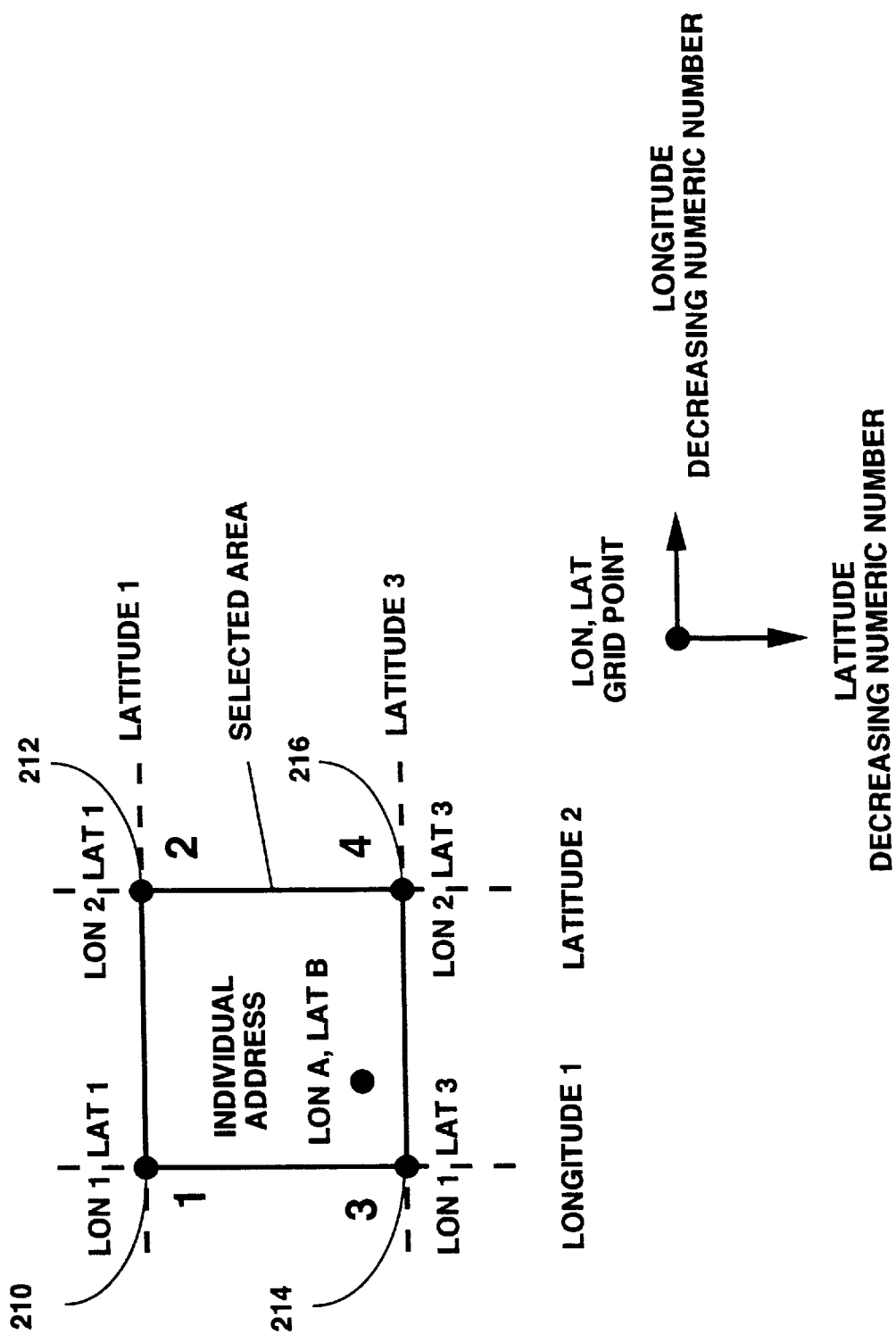
FIG. 11 is a simplified geographic depiction of a coverage area serviced by a pager-based communications system, useful in understanding one approach to communicating with receivers located within a selected sub-area located within the broad coverage area.

One example of a function for which the selective call communications systems described herein can be used to advantage is to define particular subgroups according to some predefined selection criteria, a such as standard industrial classification (SIC) codes, arbitrary geographical boundary areas as dictated by tornado paths, or governmental boundary areas. By adding such selection information into the message and thereafter decoding it in the individual receivers 208, the receivers 208 can, on an individual basis, determine whether they are part of the intended receiving group. If not, they can ignore the message. If they are, they can respond as is appropriate. The various pager-based communications systems described herein can be used to contact anywhere from one single receiver up to all the receivers in various combinations or subgroups. One important mode of operation is in using the pager-based communications system to contact receivers within a defined geographic subarea of the overall service area. One way to achieve this is through use of the latitude and longitude grid method depicted in FIG. 11. In this method and system, the agency generating or originating the message defines the intended receipt subgroup in terms of location within a rectangular area bounded by known geographic coordinates. In FIG. 11, it is assumed that the message is intended for all receivers within the rectangular area bounded by the four geographic coordinate points 210, 212, 214 and 216. The geographical coordinates are selected to correspond with the actual physical location of the area for which the message is intended and is preferably generated using a geographical map generated by a computer and displayed on a screen within the agency generating the message. By highlighting an individual area on a computer based mapping system, individual coordinates can be established for any point. By selecting four grid coordinates, a rectangular area defined along actual longitude and latitude lines, an area of desired contact can be established. By selecting and using the paging system to broadcast these four points, individual receivers 208 can determine whether they are contained within the selected area and can act accordingly.

As shown in FIG. 11, a very simple subtracting method is used by each individual receiver to determine whether it is present within the selected area. In North America, for example, the receiver 208 is within the selected area if its known geographical coordinates are such that its latitude is less than the latitudes of points 210 and 212 but greater than the latitudes of points 214 and 216, and if its longitude is less than the longitudes of points 210 and 214 but greater than the longitudes of points 212 and 216. A simple algorithm resident in each receiver 208, along with pre-installed information regarding the receiver's physical location can be used to determine whether the receiver is within the intended reception area.

More sophisticated methods can be used to select reception areas having shapes other than the simple rectangle shown. For example, multiple coordinates can be specified by the originating agency and transmitted via the paging system to define a selected reception area that is polygonal in shape. Still more sophisticated techniques can be used to define an arbitrary shape. Various algorithms can be used both in the head end communications interfaces 202 and in the function modules 208 to achieve these ends.

Still another advantageous feature that can be incorporated into one of the pager based communications systems described herein is the ability to use single or multiple message launch sites. In other words, a message that is to be transmitted to a one or more receivers can originate at more than one site and can be transmitted over the service area via one or more transmitters. In any event, the same base group address is used, and only one base group address need be procured from the pager service provider. This helps keep the system economical. Additionally, each additional launch site can be provided with similar or identical software, which provides redundancy in the event of a disaster without significantly increasing cost.

Another feature that can be incorporated is the ability to provide for over-the-air registration of individual receiving devices 208. This can be accomplished by correlating individual receiver identification numbers and address information (both longitude and latitude grid locations and governmental boundaries) to individual message launch sites. Thereafter, this information is sent to the individual receiver 208 using whichever transmitter 204 is connected to the originating message generating site. This feature also enables individual receivers 208 to be reused at a different address or location by over-the-air re-registration of the receiver 208.

Still another feature that can be incorporated is the ability to provide user authentication of the actual individual who generates the message sent to a paging transmitter 204. This increases system security by limiting access for sending messages and thus helps avoid the transmission of unauthorized messages. User authentication can be achieved by adding pass/challenge software at both the message launch site and the computer that controls access to the paging transmitter 204.

Still another feature that can be incorporated is the ability to generate time sensitive, self deleting messages that automatically erase themselves after passage of a set period of time. This feature can be implemented by inserting an additional item of information into the message that defines the length of time the message should remain in effect. The individual receivers 208 use the time out information to either retain the message or to delete it from memory if the message is stale. This feature can be used to achieve the automatic resetting of all features in the receiver 208, and provides for hands off, automatic operation. This can be of value for use in spaces, such as hotel rooms, where continuous occupancy is not feasible.

Still further refinements can be made through the inclusion of suitable control commands embedded in the messages sent to the individual receivers. In particular, an embedded code can control the amplitude, duration and pattern of audio alarms and visual annunciators so that emergency messages convey urgency audibly and visually.

Still further refinements can be made through the inclusion of suitable first digits in the command portion of the message which defines the organization and content of subsequent subgroup addresses so subgroup addresses can have different representations such as latitude and longitude coordinates, or governmental units.

Still further refinements can be made by the inclusion of a digit or character string in the control portion of the message specifying a message identifying number and by incorporating additional selective call receiver functionality. When the selective call receiver recognizes that the informational portion of the emergency message is null or contains some preassigned, rarely used character or character string, the receiver interprets this condition as an indicator to delete a previously stored message having the same message identifying number as that associated with the immediate deleting message.

Still further refinements can be made by using another digit or character string in the control portion of the message which specifies the amplitude, duration and pattern of the audio and visual annunciators of the receiver to convey the urgency of individual emergency messages.

A second important operating mode for the selective call emergency notification communications systems herein shown and described is (a) the delivery of control commands and messages to a remote location, (b) the correct routing to the particular device required to receive the command or message, and (c) the combination of different technologies into special use receivers intended for use within the system. One such special use receiver is shown at 218 in FIG. 10 and functions to forward emergency messages from one system to another paging system. In other words, the receiver 218 receives an emergency message from the selective call communications system of which it is a part, and, if appropriate instructions are received, forwards the message on for reception by other receivers 220 that are part of a different selective call system.

To accomplish this function, the special receiver 218 includes a repeating receiver media interface. The receiver 218 receives any emergency message sent from one of the head end communications interfaces 202, but then strips off all additional sub-address information, thereby leaving the actual message. The actual message is then communicated to another pager transmitter for broadcast to pagers that are not a part of the main system or included in the original subgroup of receivers. This feature allows any paging carrier to utilize messages originally sent in the first or host system even if the frequency or signaling protocol is different from the host system. Compatibility is thus assured. A similar concept can be used to interface the system to other radio based systems such as all digital personal communications systems and other such specialized radio based systems such as IVDS (Interactive Video Data Systems).

Still another feature that can be implemented is the capability of linking with other local premise based transmitter devices such as baby monitors, telephone monitors and door bell ring detectors. These are particularly useful to the hearing impaired who cannot respond to ordinary sound-based signals. Such devices can be linked to a transmitter that generates a signal received by one of the receivers 208. Previously encoded messages are sent by the transmitter in response to receipt of an appropriate signal from the detector and are sent to the appropriate receiver 208 where they are decoded. The receiver 208 then generates an appropriate display to alert the user. This feature can be incorporated into a special selective call repeater system consisting of a selective call receiver that responds to two sources of selective call signals where one source is the emergency notification communications system and the other source is an on-site selective call system. The on-site selective call system responds to door bell, telephone and other common household activities or sounds and includes a low power transmitter. The two-source selective call receiver generally uses a vibrating alarm indicator to aid persons who cannot hear sound-based warnings, signals or messages. Still another feature that can be implemented is a roving receiver 222 capable of receiving localized messages while moving within or through an affected space or area. Such a receiver 222 can be equipped, for example, with a global positioning system (GPS) receiver 224 that monitors the geographical position of the receiver 222 and supplies positioning information that can be used by appropriate circuitry within the receiver 222 to determine whether the receiver is within the geographic area specified by the message originator and encoded into the signal broadcast by the transmitter 204. If the receiver 222 is within the specified geographic area, the message is displayed. If it is not, the message is ignored. This feature can be implemented over a very wide area such as the entire United States by monitoring selected CAP (variously, Code Assignment Plan or Capture) codes. These codes can be operated by using another receiver 208 in the system that strips off any other sub-address information, but only sends out the desired geographical information (i.e, latitude and longitude) along with the main message. The roving receiver 208, upon receiving the appropriate capture code and verifying presence within the intended geographic area, would then strip off the location grid information and only display the desired message.

Figure 12:
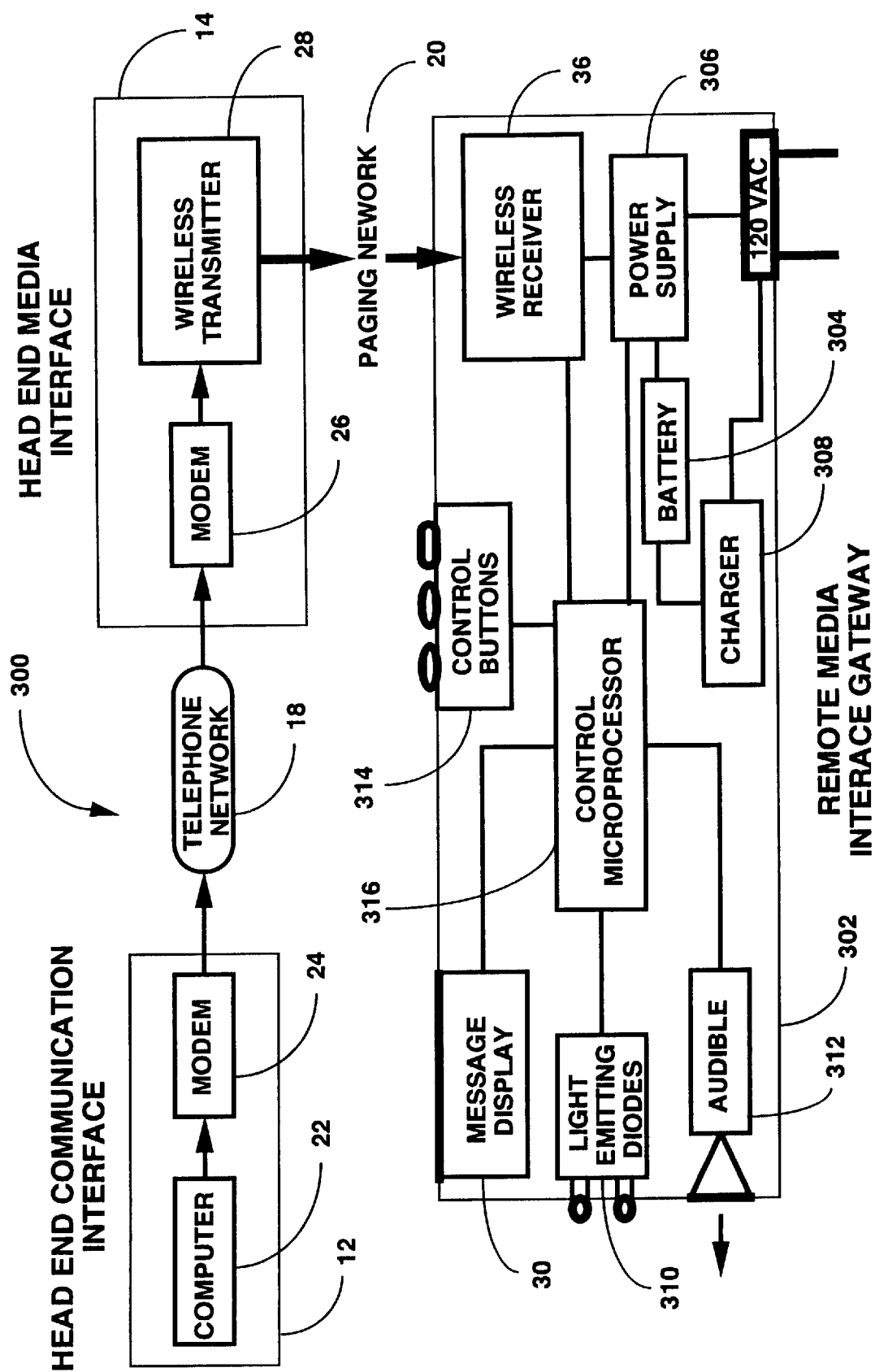
FIG. 12 is a simplified block diagram, similar to FIG. 1 of an alternate embodiment of a one-way pager-based communications system embodying various features of the invention.

Another pager-based, "one way broadcast" communications system 300 is shown in FIG. 12. In this system, the transmitting devices, i.e., the head end communications interface 12, the head end media interface 14, the telephone network 18 and the paging network 20 are as previously described. The remote media interface gateway or receiver 302, however, is different.

The receiver 302 used in the system 300 is adapted to remain operational in the event utility based power is lost. Such power failures are not uncommon when emergencies or natural disasters occur. To avoid losing the capability of receiving emergency messages just at the time communication is most important, the receiver 302 includes an internal battery 304 that automatically switches in to supply operating power in the event line current is lost.

As illustrated, power for the receiver 302 is ordinarily provided by a power supply 306 operating from ordinary 120 VAC current. Preferably, the receiver 302 comprises a self contained unit that "plugs into" a standard, residential 120 VAC outlet. The power supply 306 rectifies, filters and regulates the incoming power in known manner to supply the requisite operating voltage and current to the various receiver 302 sub-circuits. In the event line current is lost, the battery 304 automatically switches in to continue powering the receiver 302.

The battery 302 is kept at full charge by means of a charger 308 that operates from the 120 VAC line source. The charger 308 supplies current to the battery 302 as needed to keep the battery 302 at full charge. In the event of a power failure, the battery thus operates the receiver 302 beginning with a full charge.

The receiver 302 contains a message display 30 and a wireless receiver 36 that can be the same as or similar to these respective elements of the previously described receiver or remote media interface gateway 16. In addition, the receiver 302 includes a plurality of light emitting diodes (LEDs) 310, an audible alarm or transducer 312 and a plurality of control buttons 314 that enable the user to control the operation of the receiver 302. Each of these elements is coupled to a control microprocessor 316 that controls the overall operation of the receiver 302 and that can be programmed in a variety of ways to achieve various desired results. Depending upon how the control microprocessor 316 is programmed, a variety of various, specialized receivers can be realized.

One such specialized receiver that can be used as part of the systems herein described is a combination receiver and rechargeable battery-powered flashlight 226 (FIG. 10) This device 226 would normally be plugged into a standard 120 VAC outlet or source for continued powering, but would also operate from a self contained rechargeable battery kept charged by a self contained battery charger. In addition to the capabilities of the standard receivers 208, the receiver 226 would also contain a battery source and a light source, such as an illuminating lamp or high intensity light emitting diode.

Another feature that can be advantageously included is the ability to provide a rapid flashing signal using a momentary on/off button that would also extend battery charge life by minimizing extended operation. On important aspect of the receiver 226 is the dual powering function wherein the receiver 226 is powered in a normal operating mode from a 120 VAC outlet. The receiver 226 is designed to remain plugged into the wall outlet during normal use. The internal battery allows the receiver to remain operational in the event of a power failures that frequently occur as a consequence of emergency or natural disaster conditions. The light source incorporated into the receiver can be used for emergency lighting. Additionally, the receiver 226 can be operated from the battery of a vehicle to permit mobile operation or can be worn on a belt to permit personal, mobile operation.

Other such specialized receivers could incorporate smoke alarm, carbon monoxide detectors or other human and property safety devices into a common unit.

Still further benefits may be realized by incorporating two-way signaling devices and protocols so as to automatically notify a "911" or other emergency center of a fire or other hazardous condition at the earliest possible time or when occupants of a site are absent or unconscious. Although the invention has been shown and described in its preferred form using a wireless communications system such as a paging system, it will be appreciated that the invention is not limited in its broader aspects to paging systems or even to wireless communications systems. For example, the invention can also be used in connection with alternative forms of communication and message delivery such as wireless telephones, the internet, hardwired computer systems, television or other broadcast receivers or combinations of such devices.

Figure 13:
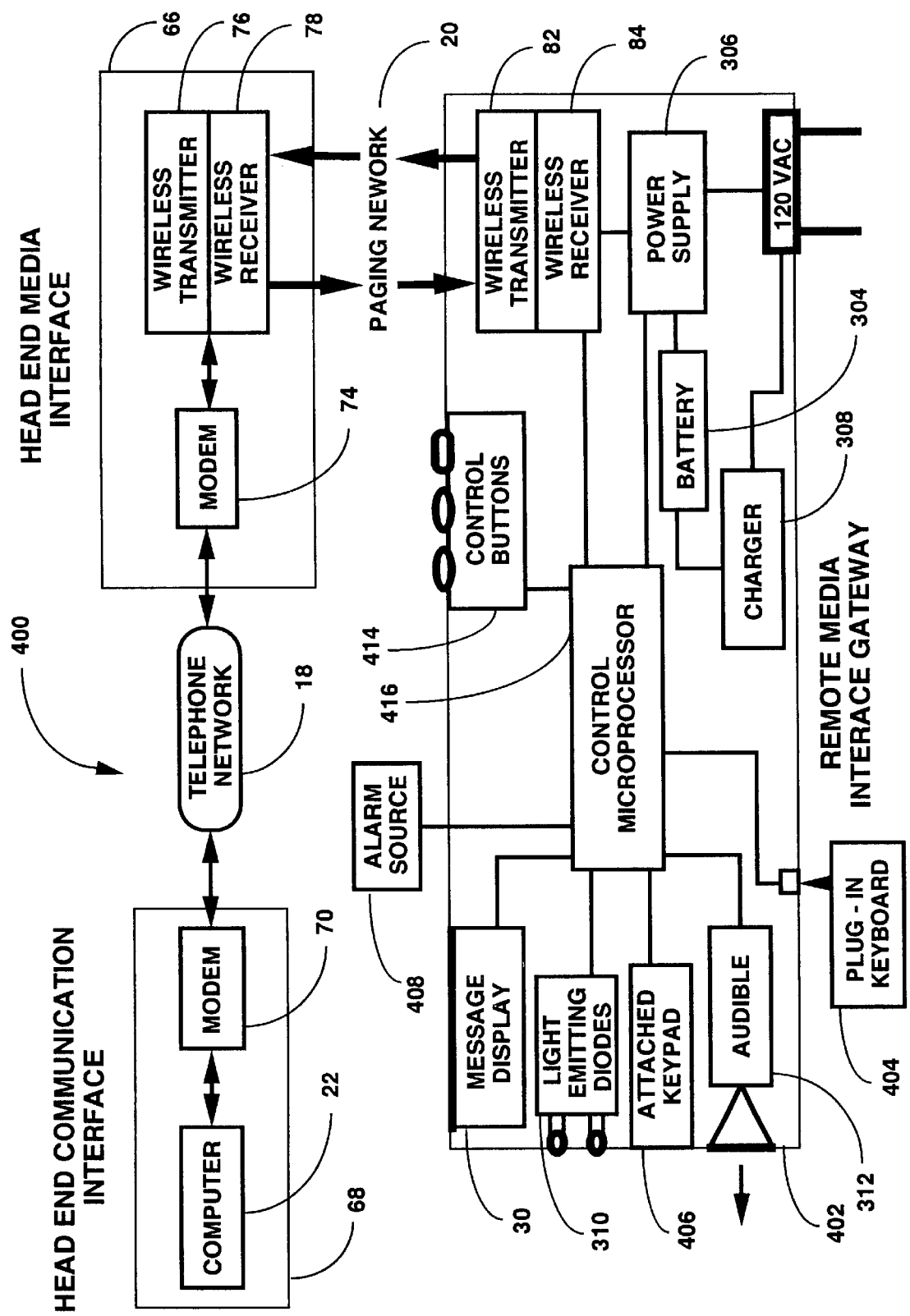
FIG. 13 is a simplified block diagram of a two-way pager based communications system embodying various features of the invention.

A two way broadcast communications system 400 is shown in FIG. 13. In this system, the head end communications interface 68, the head end media interface 66, the telephone network 18, and the paging network 20 are as previously described in FIG. 3. The communication between the head end communication interface and the head end media interface for any of the embodiments, should not be limited to the telephone network 18, but could be replaced with communication through the internet, a frame relay or wireless communication between modem 70 and modem 74. The remote media interface gateway or transceiver 402 has two-way communication as opposed to the one way communication of the receiver 302 in FIG. 12.

The transceiver 402 has all the features of the receiver 302 and the ability to send messages back to the head end communication interface 68. The wireless receiver 36 is replaced with a wireless transmitter 82 and a wireless receiver 84. The control processor 416 is programmed to accept entries from either a plug in keyboard 404, an attached keypad 406, or an alarm source 408 and send the entries to the head end communication interface 68 through the wireless transmitter 82. The control buttons 414 allow a keyed-in message or an acknowledgement to be sent back to the head end communication interface 68 through the head end media interface 66.

Figure 14:
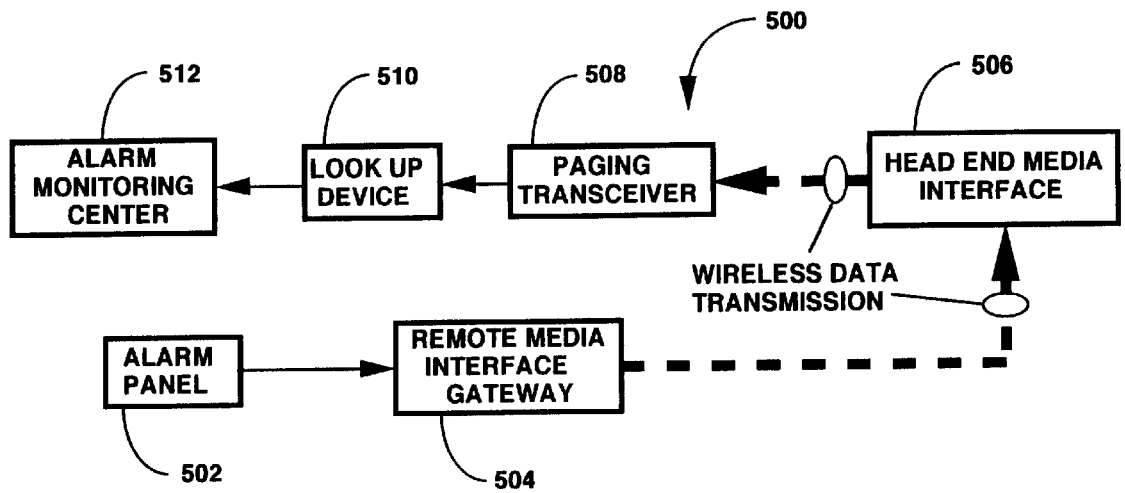
FIG. 14 is a simplified block diagram of an aloha message based security system embodying various features of the invention.

FIG. 14 shows an aloha message based security system 500. The aloha message based security system 500 includes an alarm panel 502, a remote media interface gateway 504, a head end media interface 506, a paging transceiver 508, a look-up device 510, and an alarm monitoring center 512. The alarm panel 502 is disposed somewhere inside a building and is connected to the paging transceiver 504. An aloha message contains a header and an eleven bit message. The header contains the personal identification number (pin)/account number of the unit sending the message and some network message control information overhead.

Fire and security are two types of alarm information which may be sent to the alarm monitoring center 512. The aloha message based security system 500 uses at least two bits of information to describe a fire or a breach of security. Additional information such as alarm zone information may also be encoded utilizing additional bits of information. If a fire, or breach of security occurs, the alarm panel 502 will send an alarm code to the remote media interface 504. The remote media interface gateway 504 will convert the alarm code into an eleven bit message and transmit the aloha message to the head end media interface 506. The aloha message is transmitted to the alarm monitoring center 512 through the paging transceiver 508. The link between the alarm panel and the remote media interface gateway 504 in FIGS. 14–15 may also be wireless.

Preferably, the paging transceiver 508 and the look-up device 510 are disposed at the alarm monitoring center 512. The look-up device 510 in its basic form is a microprocessor and a memory device containing customer and alarm information. The remote media interface gateway 504 receives the aloha message and the look-up device 510 decodes it. The look-up device 510 performs two functions. First, the look-up device 510 compares the pin/account number contained in the header to a list of customers. Second, the look-up device 510 compares the information contained in the eleven bit message to a list of alarm codes. When the customer and alarm codes are matched-up, the look-up device 510 sends the customer's alarm situation to the alarm monitoring center 512. The paging transceiver 508 could be replaced with a modem. The connection between the paging transceiver 508 and the head end media interface 506 could be a telephone line, internet connection, or frame relay connection.

Figure 15:
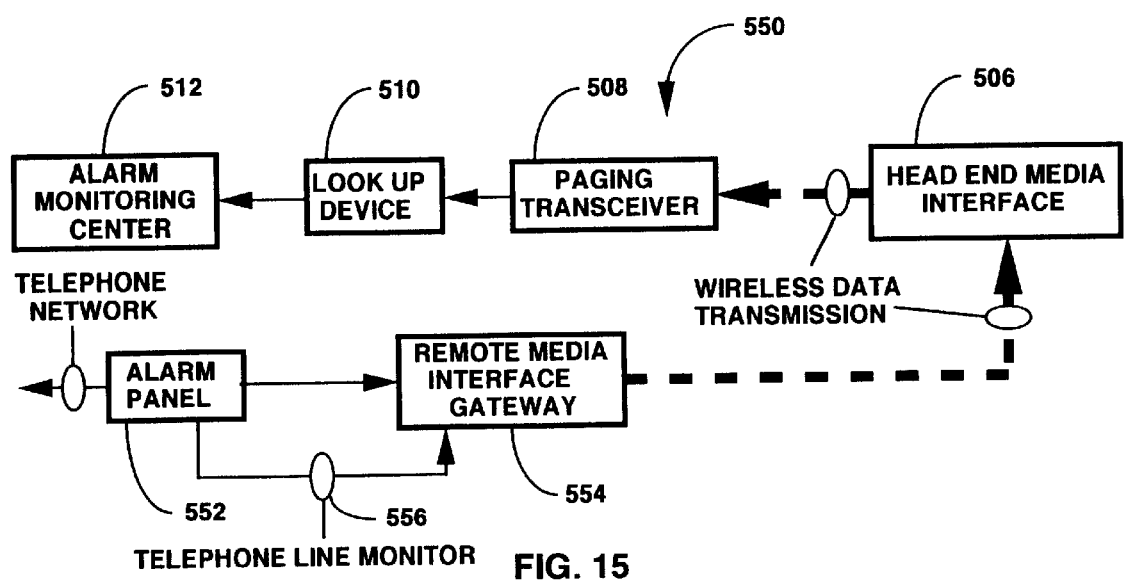
FIG. 15 is a simplified block diagram of an aloha message based security system with the added feature of a telephone line failure monitor embodying various features of the invention.

FIG. 15 shows an aloha message based security system with telephone line monitoring 550. The aloha message based security system with telephone line monitoring 550 includes an alarm panel 552, a remote media interface gateway 554, a head end media interface 506, a paging transceiver 508, a look-up device 510, and an alarm monitoring center 512. The alarm panel 552 is disposed somewhere inside a building and is connected to the paging transceiver 554. An aloha message contains a header and an eleven bit message. The header contains a pin/account number and the message, eleven bits of information.

In addition to detection of fire and breaches of security, the aloha message based security system with telephone line monitoring will monitor a telephone line failure through a hard wire connection to the telephone line monitor 556. The alarm panel 552 is also connected to the remote media interface gateway 554 with a telephone line monitor 556. If the telephone line is cut, the remote media interface gateway 554 will detect the cut and send an aloha message to the alarm monitoring center 512. If the telephone line has not been cut, but the alarm activated, the telephone line will be used to report the alarm to the alarm monitoring center 512. The aloha message based security system with telephone line failure monitoring 550 uses at least three bits of information to describe a fire, a breach of security, or a telephone failure. If a fire, breach of security or telephone failure occurs, the alarm panel 552 will send an alarm code to the remote media interface gateway 554. The remote media interface gateway 554 will convert the alarm code into an eleven bit message and transmit the aloha message to the head end media interface 506. The aloha message is transmitted to the alarm monitoring center 512 through the remote paging transceiver 508.

The operation of the paging transceiver 508, the look-up device 510, and the alarm monitoring center 512 are the same as in FIG. 14. However, the look-up device 510 will include alarm codes which also pertain to telephone failures. The preferred operation will require both an alarm condition in the alarm panel 552 and a telephone failure as indicated by the telephone line monitor 556 to occur before an aloha message is sent to minimize false alarm reporting.

Figure 16:
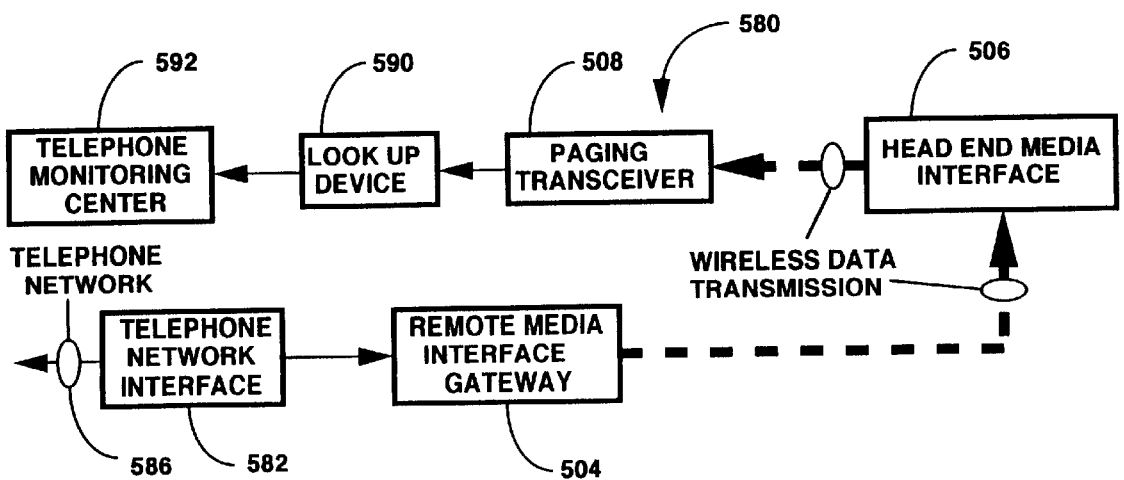
FIG. 16 is a simplified block diagram of an aloha message based telephone line failure system embodying various features of the invention.

FIG. 16 shows an aloha message based telephone line monitor 580. The aloha message based telephone line monitor 580 includes a telephone network interface 582, a remote media interface gateway 504, a head end media interface 506, a paging transceiver 508, a look-up device 590, and an alarm monitoring center 592. The telephone network interface 582 is disposed somewhere inside a building and is connected to the paging transceiver 504.

A telephone line failure is another type of failure which could be sent to the telephone monitoring center 592. The aloha message based telephone line monitor 580 uses at least one bit of information to describe a telephone line failure. If a telephone line failure occurs on the telephone network 586, the telephone network interface 582 will send an alarm code to the remote media interface gateway 504. The remote media interface gateway 504 will convert the alarm code into an eleven bit message and transmit the aloha message to the head end interface 506. The aloha message is transmitted to the telephone monitoring center 592 through the paging transceiver 508.

Preferably, the paging transceiver 508 and the look-up device 590 are disposed at the telephone monitoring center 592. The look-up device 590 in its basic form is a microprocessor and a memory device containing the customer and alarm information. The paging transceiver 508 receives the aloha message and the look-up device decodes it. The look-up device 590 performs two functions. First, the look-up device 590 compares the pin/account number contained in the header to a list of customers. Second, the look-up device 590 compares the information contained in the eleven bit message to a list of alarm codes. When the customer and alarm codes are matched-up, the look-up device 590 sends the customer's alarm situation to the telephone monitoring center 592. The paging transceiver 508 could be replaced with a modem. The communication to and from the head end media interface 506 in FIGS. 14–16 should not be limited to a wireless data transmission only, but could include a telephone network, a frame relay, or data packet.

Figure 17:
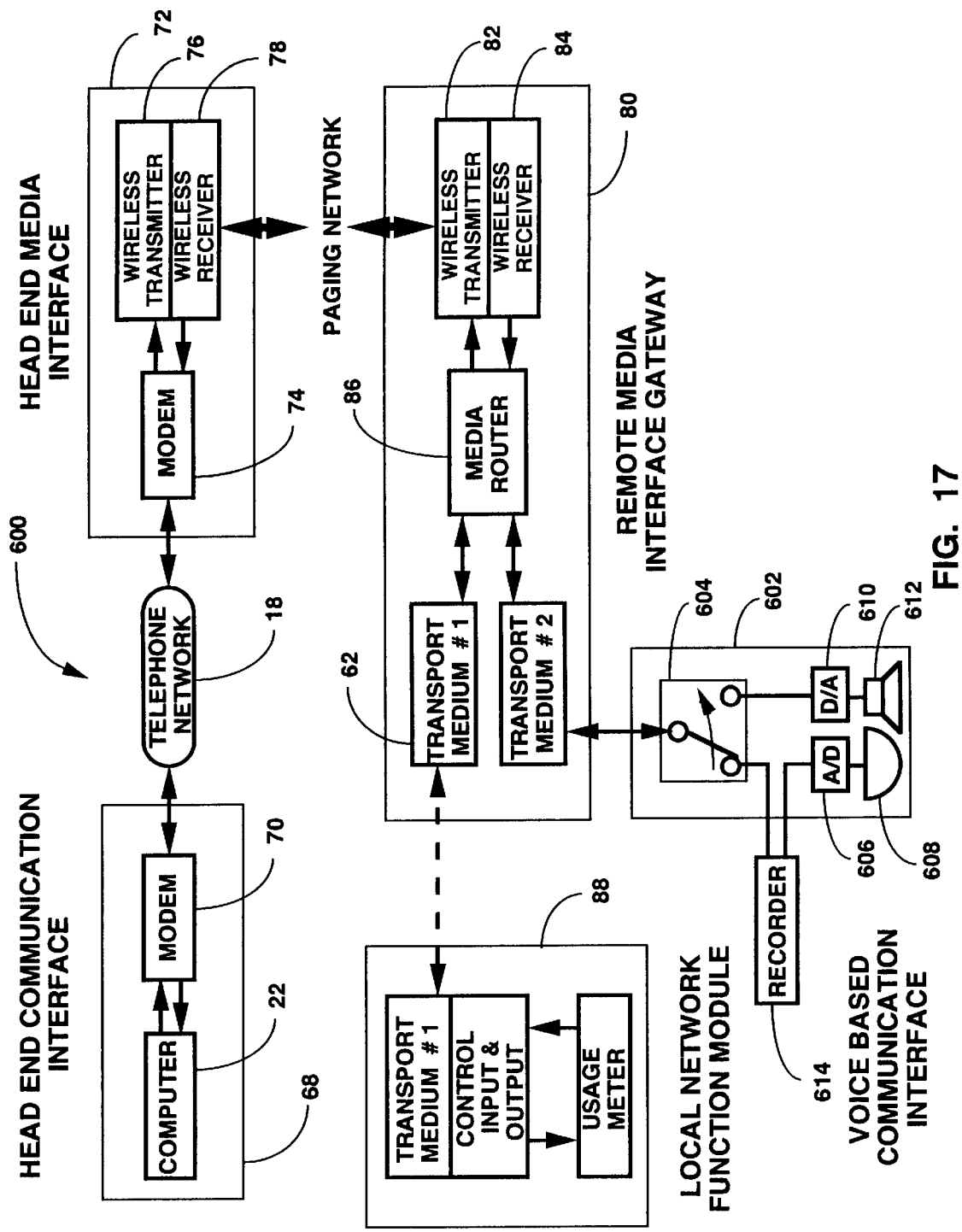
FIG. 17 is a simplified block diagram of a two-way communication system utilizing a voice based communication interface embodying various features of the invention.

FIG. 17 discloses a voice based communication interface 602 which works with a two-way communication system 600. The two-way communication system 600 includes a head end communication interface 68 which communicates through a telephone network 18 to a head end media interface 72. The head end media interface 72 communicates with a remote media interface gateway 80 through a paging network. The remote media interface gateway 80 is connected to the voice based communication interface 602. The voice based communication interface 602 includes a switcher box 604, an analog to digital converter 606, a microphone 608, a digital to analog converter 610 and a speaker 612.

The switcher box 604 toggles between the microphone 608 and the speaker 612. The switcher box 604 may be operated manually or automatically. The analog to digital converter 606 takes the analog output from the microphone and converts it into a digital signal to be sent through the two-way communication system 600. The digital to analog converter 610 takes the digital output from the two-way communication system 600 and converts it into an analog signal which is used to drive the speaker 612.

A digital recorder 614 may be used to monitor a particular area where the voice based communication system 602 is placed or the digital recorder 614 may be used to send a particular voice message in the event of a security breach or equipment failure. While the invention describes a voice based communication, any analog sound may be communicated.

Figure 18:
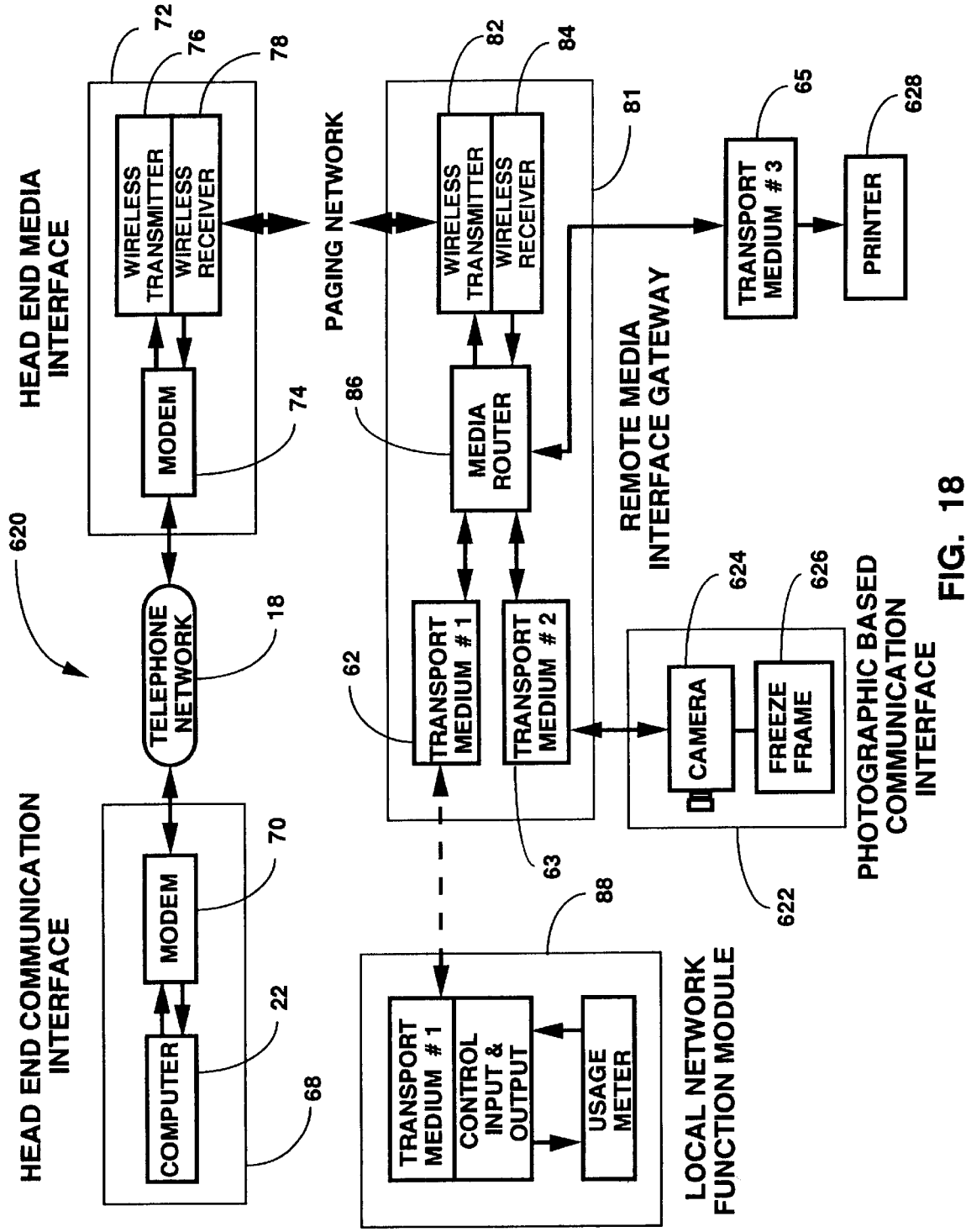
FIG. 18 is a simplified block diagram of a two-way communication system utilizing a photographic based communication interface embodying various features of the invention.

FIG. 18 discloses an image based communication interface 622 which works with an image based communication system 620. The image based communication system 620 includes a head end communication interface 68 which communicates through a telephone network 18 to a head end media interface 72. The head end media interface 72 communicates with a remote media interface gateway 81 through a paging network. The remote media interface gateway 81 is connected to the image based communication interface 622 through a media router 86. The image based communication interface 622 includes a camera 624 and a freeze frame unit 626. The freeze frame unit 626 gives the camera 624 the ability to capture a photographic or visual image of an intruder. The camera 624 with freeze frame unit 626 would be used for security monitoring applications. A reverse application would add a printer capability. A printer 628 could be connected to the remote media interface gateway 81 through a transport medium 65; this would allow any graphic or photographic image to be sent back to the head end communication interface 68. While the invention describes a photographic communication, any image could be communicated.

Figure 19:
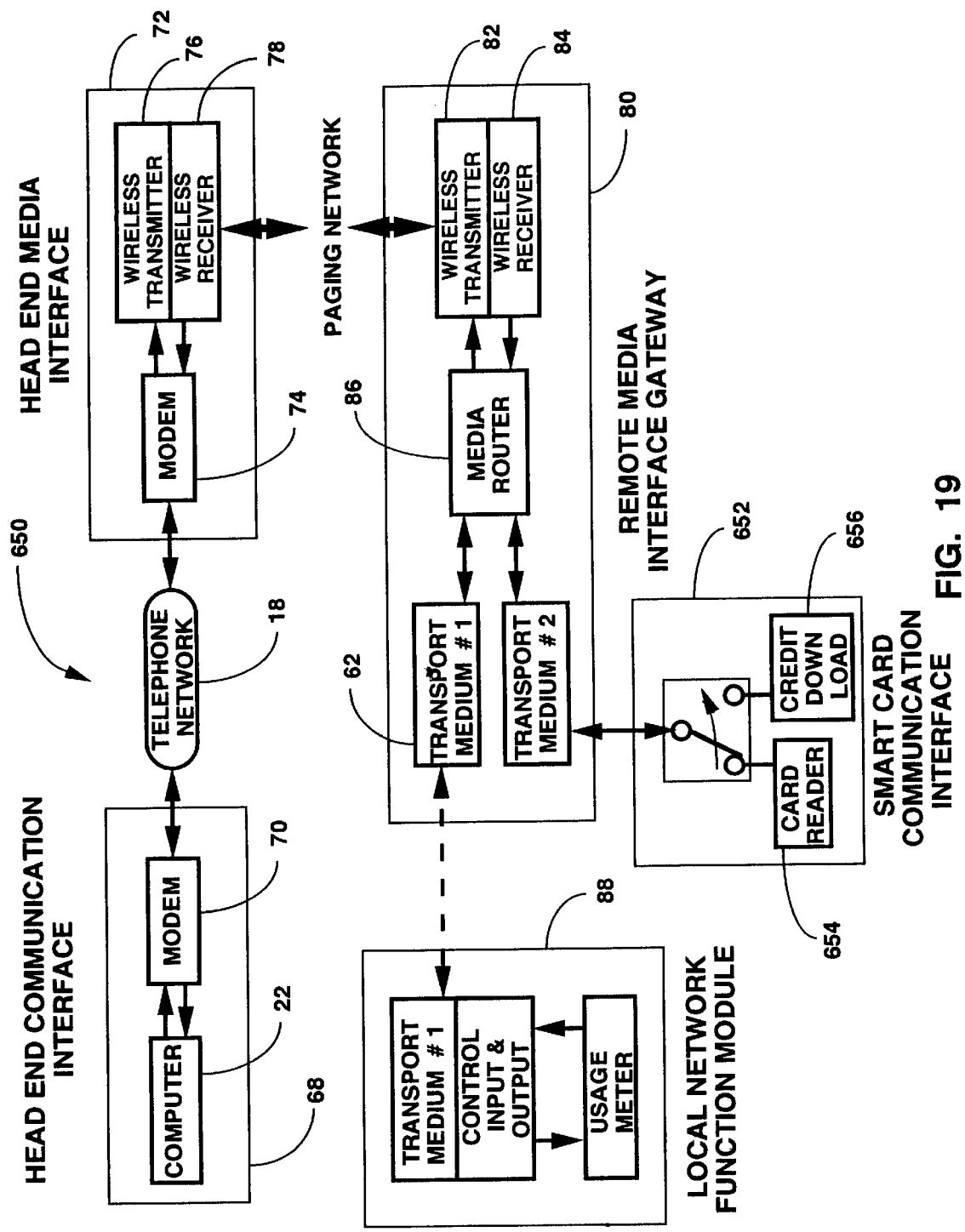
FIG. 19 is a simplified block diagram of a two-way communication system utilizing a smart card based communication interface embodying various features of the invention.

FIG. 19 discloses a smart card based communication interface 652 which works with a two-way smart card based communication system 650. The two-way smart card based communication system 650 includes a head end communication interface 68 which communicates through a telephone network 18 to a head end media interface 72. The head end media interface 72 communicates with a remote media interface gateway 80 through a paging network. The smart card based communication interface 652 includes a card reader 654 and a credit download terminal 656. The card reader 654 may be used to verify credit cards, or pay a bill with a cash card. The credit download terminal 656 may be used to provide reverse credit authorization, down load electronic credit, or down load electronic cash. The smart card based communication interface 652 could provide an utility company with an alternative method of handling nonpaying or slow paying customers.

Figure 20:
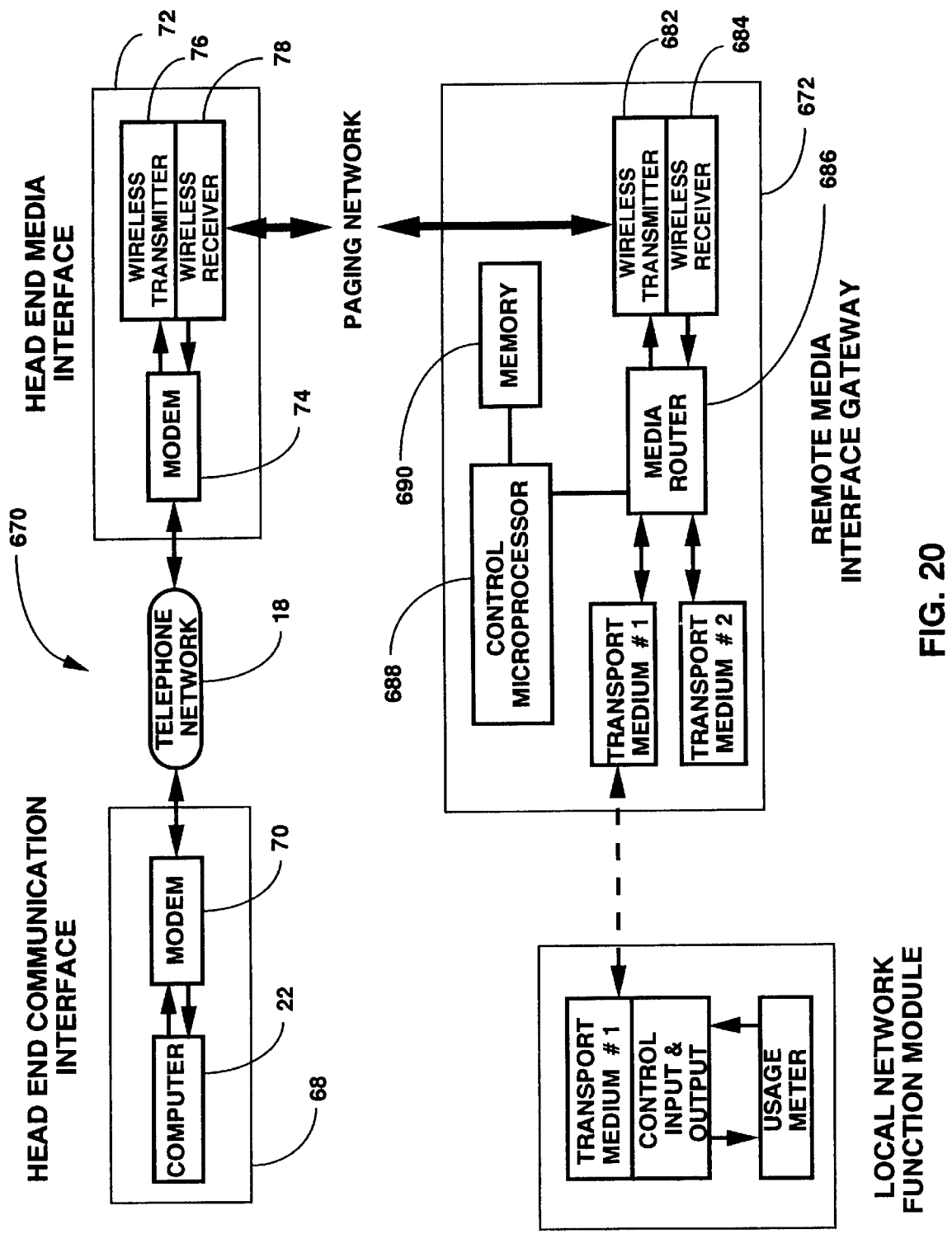
FIG. 20 is a simplified block diagram of a two-way authentication/encrypting communication system embodying various features of the invention.

FIG. 20 discloses an authentication/encrypting two-way communication system 670. The authentication/encrypting two-way communication system 670 includes a head end communication interface 68 which communicates through a telephone network 18 to a head end media interface 72. The head end media interface 72 communicates with a remote media interface gateway 672 through a paging network or the like. The remote media interface gateway 672 includes a control microprocessor 688 and memory 690. The authentication/encrypting algorithm is stored in the memory 690. The memory 690 is preferably of a non-volatile or flash type to allow the authentication/encrypting algorithm to be replaced by wireless communication. The authentication/encrypting algorithm is also stored in the computer 22.

Sometimes it is necessary to authenticate a message received from a remote location to certify that the message did indeed come from the correct location, and not from some device simulating the location. There are three ways of authenticating a message sent from a remote location. A first way of providing identification is to send a randomly generated string of characters from the head end communications interface 68 along with an encrypting algorithm return pointer and a message/command to the remote media interface gateway 672. The random string of characters and encrypting algorithm return pointer are received by the control processor 688. The control processor 688 encrypts the random string of characters using the specified algorithm in a look-up table in memory and sends the encrypted string back to the head end communication interface 68. The head end communications interface 68 decodes the encrypted random string of characters with the algorithm originally identified. The authentication/encrypting algorithm could be the same or different for each remote media interface gateway within a particular group. If the decoded random string of characters match the original randomly generated random string of characters then the head end communications interface 68 accepts the return message/command.

A second way of providing identification is to send an encrypted random character string from the head end communications interface 68 along with an encrypting algorithm return pointer and a message/command to the remote media interface gateway 672. The encrypted random string of characters and encrypting algorithm return pointer are received by the control processor 688. The control processor 688 decodes the random string of characters using the specified algorithm in a look-up table in memory. The control processor 688 encrypts the random string of characters with a second algorithm. The control processor 688 sends the newly encrypted random string of characters, the second algorithm return pointer, a return message/command, and an identification number of the remote media interface gateway 672 to the head end communication interface 68. The head end communications interface 68 decodes the newly encrypted random string of characters with the algorithm identified by the second algorithm return pointer. The authentication/encrypting algorithm could be the same or different for each remote media interface gateway within a particular group. If the decoded modified string of characters match the original randomly generated string of characters then the head end communications interface 68 accepts the return message/command.

A third way of providing identification is to send a random character string only from the head end communications interface 68 to the remote media interface gateway 672. The control processor 688 encrypts the random string of characters and includes an algorithm return pointer which identifies the algorithm used for encryption. The control processor 688 sends the encrypted random string of characters, with algorithm return pointer, a return message/command, and an identification number of the remote media interface gateway 672 to the head end communication interface 68. The head end communications interface 68 decodes the encrypted random string of characters with the algorithm identified by the algorithm return pointer. The authentication/encrypting algorithm could be the same or different for each remote media interface gateway within a particular group. If the decoded random string of characters match the original randomly generated random string of characters then the head end communications interface 68 accepts the return message/command.

The authentication/encrypting two-way communication system 670 may be reversed when a randomly generated string of characters is sent from the remote media interface gateway 672 to the head end communication interface 68. The remote media interface gateway 672 will know that it sent a message to the correct head end communication interface 68 and not some simulated device.

An additional feature of the authentication/encrypting two-way communication system 670 which increases security for the above process is the incorporation of the time synchronization component which is part of the Motorola FLEX ReFLEX protocol. The time synchronization component is incorporated into the authentication/encrypting interface in the following way. The head end communication interface 68 is time synchronized with the remote media interface gateway 672. The head end communication interface 68 will have a different encrypting key for any particular time slot. For example, if a message is sent 30 seconds from the beginning of the four minute time period; encrypting key C is used. If a message is sent 85 seconds from the beginning of the four minute time period; encrypting key E is used. The remote media interface gateway 672 will be able to decode a message sent from the head end communication interface 68, because it will know the identification number of the head end communication interface 68 and the particular encrypting key being used to transmit the message during a particular time segment.

The changing encryption system coupled with other system features, such as randomly generated character authentication, and identification numbers provide a much higher level of data security.

Another additional capability of the authentication/encrypting two-way communication system 670 is the ability to send encrypting algorithms or single public and private encryption keys over the wireless network. By using the acknowledgement capability of the authentication/encrypting two-way communication systems 670, the algorithms can be encrypted, and sent over the system in a changing sequence, but continually confirmed by acknowledging the receipt of the new algorithms or keys. Currently, "key control" and the ability to send new keys is limited, and cumbersome at best. A superior control method results by using wireless communication to transfer algorithms and keys from one remote location to another.

The above methods for authentication/encryption should not be limited to each being applied in isolation, but any method may be combined with another method for authentication/encryption.

Figure 21:
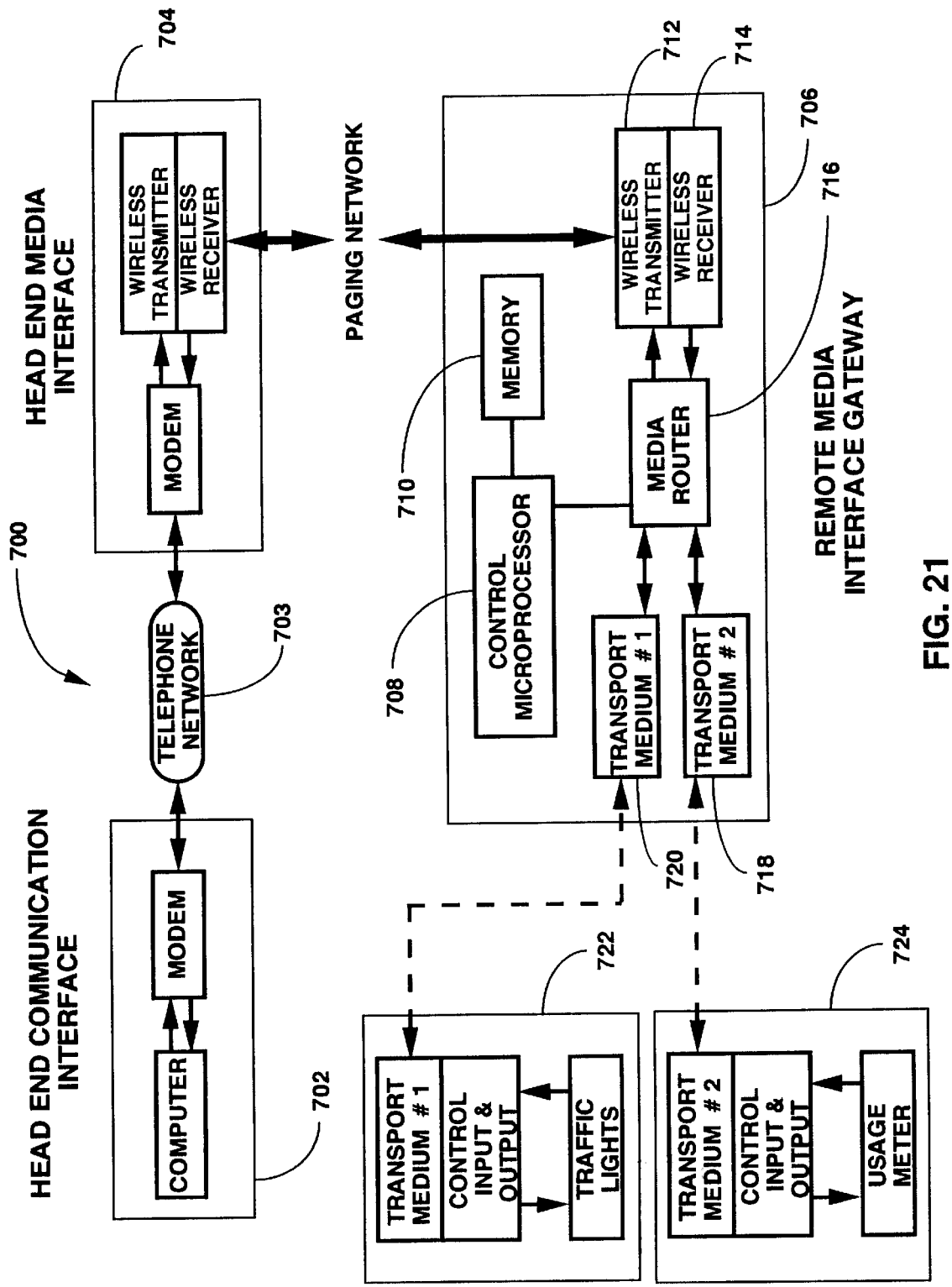
FIG. 21 is a simplified block diagram of a time synchronization communication system embodying various features of the invention.

FIG. 21 discloses a time synchronization communication system 700. The time synchronization communication system 700 includes a head end communication interface 702 which communicates through telephone network 703 to a head end media interface 704. The head end media interface 704 communicates with a remote media interface gateway 706 through a paging network or the like. The remote media interface gateway 706 includes a control microprocessor 708 and memory 710. The remote media interface gateway 706 may communicate with a local network function module having traffic lights 722 or a local network function module having a usage meter 724.

The clock of a module will drift over a period of time. The time synchronization communication system 700 sends a time check, message, or rate change update from the head end communication interface 702 to the remote media interface gateway 706 through the head end media interface 704. The control microprocessor 708 reviews the time check, message, or rate change update and sends an appropriate message to one of the local network function modules. If a time check is sent, the time in the remote media interface gateway 706 will be compared to the time in the local network function module. If the time in the remote media interface gateway 706 differs from the time in the local network function module; the clock circuit in the local network function module is reset.

Preferably, the Motorola Flex ReFlex protocol is used to communicate automatic time checks, messages, and rate change updates. The local network function module will receive an automatic time check every four minutes from the remote media interface gateway 706. A rate change may be sent along with the time check. With usage meters, it is critical that the usage meters have the correct time to ensure that a rate change will be correctly assessed to the utility customer. With traffic light applications, it is critical that the traffic lights operate on the same time table. If the traffic lights are not synchronized, the light changing patterns will be off and cause inefficient traffic flow. The time synchronization communication system 700 also allows different light changing patterns to be sent to the traffic lights during different periods of the day.

Although inserting a subgroup address into a message portion on the forward path is the most important application of this invention (ie: from head end communication interface to remote media interface gateway). The subgroup address insertion may also be included on the return path (ie: from remote media interface gateway to head end communication interface). The return message includes bits which define network overhead, a local network function module pin number, and a message portion. The subgroup address is inserted into the message portion as on the forward path. The only hardware requirements for implementing the subgroup addressing on the return path is the inclusion of a microprocessor and memory device in a remote media interface gateway. The microprocessor as instructed by the software in the memory device inserts a subgroup address into the message portion of the message.

A first example of an application for the subgroup address on the return path could be communication from one local network function module to another which requires communication to and from the head end communication interface. A second application would ensure that two local network function modules which happen to have the same pin number could be uniquely identified by their subgroup address.

It is preferable that the remote media interface gateway have limited protocol translation. Limited protocol translation allows a remote media interface gateway to communicate with many device modules each having different protocols. The limited protocol translation utilizes a limited number of alarm codes from each protocol and places them in a look-up table. There are many different codes that a module device is capable of communicating, but only the alarm codes are needed for communication with the remote media interface gateway. A protocol translation that the remote media interface gateway understands is also included with the alarm code. Using a limited number of alarm codes from each protocol reduces necessary memory space in the remote media interface. The use of a limited number of alarm codes also reduces the time and expense of having to do a code for code conversion for each and every protocol. Learning an entire protocol may require cooperation from the manufacturer, there is no guarantee that the manufacture will give the necessary cooperation.

Although the invention has been shown and described in its preferred form using a wireless communications system such as a paging system, it will be appreciated that the invention is not limited in its broader aspects to paging systems or even to wireless communications systems. For example, the invention can also be used in connection with alternative forms of communication and message delivery such as wireless telephones, the internet, hardwired computer systems, television or other broadcast receivers or combinations of such devices.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A method for directing a single message to an arbitrarily defined subgroup within a plurality of potential message recipients, comprising the steps of:

providing a single message which includes a base group address and a message portion;

including an arbitrarily defined subgroup address in said message portion, said single message becoming a single appended message with the incorporation of said arbitrarily defined subgroup address;

transmitting said single appended message to a plurality of the potential message recipients; and providing a plurality of receivers which are responsive to said base group address and being further responsive to said arbitrarily defined subgroup address incorporated into said message portion, each of said plurality of receivers further being associated with members of a specific group.

2. The method for directing a single message to an arbitrarily defined subgroup within a plurality of potential message recipients of claim 1, wherein:

said transmitter and said plurality of receivers being a part of a paging system.

3. The method for directing a single message to an arbitrarily defined subgroup within a plurality of potential message recipients of claim 1, further comprising:

said arbitrarily defined subgroup address being inserted into said message portion with a head end communication interface, said head end communication sending said single appended message to said transmitter.

4. The method for directing a single message to an arbitrarily defined subgroup within a plurality of potential message recipients of claim 1, wherein:

said arbitrarily defined subgroup address defining geographic coordinates, said single appended message going out to every potential message recipient contained within said geographic coordinates.

5. The method for directing a single message to an arbitrarily defined subgroup within a plurality of potential message recipients of claim 1, wherein:

each said receiver having a rechargeable battery and a charger circuit, said charger circuit being operable from a wall socket, each said receiver being structured to plug into a wall socket.

6. A method for directing a single message to an arbitrarily defined subgroup within a plurality of potential message recipients, comprising the steps of:

providing a single message which includes a base group address and a message portion;

including an arbitrarily defined subgroup address in said message portion, said single message becoming a single appended message with the incorporation of said arbitrarily defined subgroup address;

providing a head end media interface which transmits said single appended message to a plurality of the potential message recipients; and said head end media interface receiving messages; and providing a plurality of transceivers which are responsive to said base group address and being further responsive to said arbitrarily defined subgroup address incorporated into said message portion, each of said plurality of transceivers further being associated with members of a specific group, each said transceiver transmitting messages to said head end media interface.

7. The method for directing a single message to an arbitrarily defined subgroup within a plurality of potential message recipients of claim 6, wherein:

said head end media interface and said plurality of transceivers being a part of a paging system.

8. The method for directing a single message to an arbitrarily defined subgroup within a plurality of potential message recipients of claim 6, further comprising:

said arbitrarily defined subgroup address being inserted into said message portion with a head end communication interface, said head end communication sending said single appended message to said transmitter.

9. The method for directing a single message to an arbitrarily defined subgroup within a plurality of potential message recipients of claim 6, wherein:

a plurality of head end communication interfaces, each said head end communication interface communicating with one of a plurality of transmitters.

10. The method for directing a single message to an arbitrarily defined subgroup within a plurality of potential message recipients of claim 6, wherein:

said arbitrarily defined subgroup address defining geographic coordinates, said single appended message going out to every potential message recipient contained within said geographic coordinates.

11. The method for directing a single message to an arbitrarily defined subgroup within a plurality of potential message recipients of claim 6, wherein:

each said transceiver having a rechargeable battery and a charger circuit, said charger circuit being operable from a wall socket, each said receiver being structured to plug into a wall socket.

12. The method for directing a single message to an arbitrarily defined subgroup within a plurality of potential message recipients of claim 1, further comprising:

said single appended message further including an informational portion, each said receiver being responsive to said informational portion by exhibiting at least one of the following responses: activating of an audible transducer, illuminating a light emitting device, displaying a message.

13. A method for directing a single message to an arbitrarily defined subgroup within a plurality of potential message recipients, comprising the steps of:

providing a single message which includes a base group address and a message portion;

including an arbitrarily defined subgroup address in said message portion, said single message becoming a single appended message with the incorporation of said arbitrarily defined subgroup address, said arbitrarily defined subgroup address defining geographic coordinates, said single appended message going out to every potential message recipient contained within said geographic coordinates;

transmitting said single appended message to a plurality of the potential message recipients; and providing a plurality of receivers which are responsive to said base group address and being further responsive to said arbitrarily defined subgroup address incorporated into said message portion, each of said plurality of receivers further being associated with members of a specific group.

14. The method for directing a single message to an arbitrarily defined subgroup within a plurality of potential message recipients of claim 13, wherein:

said transmitter and said plurality of receivers being a part of a paging system.

15. The method for directing a single message to an arbitrarily defined subgroup within a plurality of potential message recipients of claim 13, further comprising:

said arbitrarily defined subgroup address being inserted into said message portion with a head end communication interface, said head end communication sending said single appended message to said transmitter.

16. The method for directing a single message to an arbitrarily defined subgroup within a plurality of potential message recipients of claim 13, wherein:

each said receiver having a rechargeable battery and a charger circuit, said charger circuit being operable from a wall socket, each said receiver being structured to plug into a wall socket.

17. A method for directing a single message to an arbitrarily defined subgroup within a plurality of potential message recipients, comprising the steps of:

providing a single message which includes a base group address and a message portion;

including an arbitrarily defined subgroup address in said message portion, said single message becoming a single appended message with the incorporation of said arbitrarily defined subgroup address, said arbitrarily defined subgroup address defining geographic coordinates, said single appended message going out to every potential message recipient contained within said geographic coordinates;

providing a head end media interface which transmits said single appended message to a plurality of the potential message recipients; and said head end media interface receiving messages; and providing a plurality of transceivers which are responsive to said base group address and being further responsive to said arbitrarily defined subgroup address incorporated into said message portion, each of said plurality of transceivers further being associated with members of a specific group, each said transceiver transmitting messages to said head end media interface.

18. The method for directing a single message to an arbitrarily defined subgroup within a plurality of potential message recipients of claim 17, wherein:

said head end media interface and said plurality of transceivers being a part of a paging system.

19. The method for directing a single message to an arbitrarily defined subgroup within a plurality of potential message recipients of claim 17, further comprising:

said arbitrarily defined subgroup address being inserted into said message portion with a head end communication interface, said head end communication sending said single appended message to said transmitter.

20. The method for directing a single message to an arbitrarily defined subgroup within a plurality of potential message recipients of claim 17, wherein:

a plurality of head end communication interfaces, each said head end communication interface communicating with one of a plurality of transmitters.

21. The method for directing a single message to an arbitrarily defined subgroup within a plurality of potential message recipients of claim 17, wherein:

each said transceiver having a rechargeable battery and a charger circuit, said charger circuit being operable from a wall socket, each said receiver being structured to plug into a wall socket.

* * * * *

UNITED STATES PATENT AND TRADEMARK OFFICE
Certificate

Patent No. 6,346,890 B1          Patented: February 12, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert W. Bellin, Hartland, WI; Kendall E. Post, Madison, WI; Thomas P. Blandino, Cottage Grove, WI; and Kenneth R. Clark, Monona, WI.

Signed and Sealed this Third Day of December 2002.

MICHAEL HORABIK
*Supervisory Patent Examiner*
Art Unit 2635